United States Patent
Yang et al.

(10) Patent No.: US 8,807,817 B2
(45) Date of Patent: Aug. 19, 2014

(54) COLORFUL DIFFRACTIVE LUMINAIRES PROVIDING WHITE LIGHT ILLUMINATION

(75) Inventors: Zhaohui Yang, North Oaks, MN (US); David S. Thompson, West Lakeland, MN (US); Vivian W. Jones, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 176 days.

(21) Appl. No.: 13/572,823

(22) Filed: Aug. 13, 2012

(65) Prior Publication Data

US 2014/0043847 A1    Feb. 13, 2014

(51) Int. Cl.
*F21V 13/02*    (2006.01)

(52) U.S. Cl.
USPC ........... 362/606; 362/607; 362/608; 362/609; 362/610

(58) Field of Classification Search
USPC .................................. 362/606–610
See application file for complete search history.

(56) References Cited

U.S. PATENT DOCUMENTS

| | | |
|---|---|---|
| 4,082,415 A | 4/1978 | Brooks |
| 4,550,973 A | 11/1985 | Hufnagel |
| 5,537,245 A | 7/1996 | Migozzi |
| 5,543,228 A | 8/1996 | Taniguchi |
| 5,703,667 A | 12/1997 | Ochiai |
| 6,568,841 B2 | 5/2003 | Van Santen |
| 6,773,126 B1 | 8/2004 | Hatjasalo |
| 7,018,060 B2 * | 3/2006 | Choi et al. ............... 362/601 |
| 7,682,062 B2 | 3/2010 | Stadtwald-Klenke |
| 2004/0130879 A1 | 7/2004 | Choi |
| 2004/0156182 A1 | 8/2004 | Hatjasalo |
| 2005/0111814 A9 | 5/2005 | Chen |
| 2005/0213348 A1 | 9/2005 | Parikka |
| 2006/0279296 A1 | 12/2006 | Lee |

(Continued)

FOREIGN PATENT DOCUMENTS

| | | |
|---|---|---|
| DE | 20 2008 001 960 U1 | 6/2008 |
| EP | 1351074 | 10/2003 |

(Continued)

OTHER PUBLICATIONS

PCT International Search Report for PCT/US2013/050606, mailed Oct. 23, 2013.

(Continued)

*Primary Examiner* — Stephen F Husar
*Assistant Examiner* — James Cranson, Jr.
(74) *Attorney, Agent, or Firm* — Lance L. Vietzke

(57) ABSTRACT

Extended area lighting devices include a light guide and diffractive surface features on a major surface thereof. The diffractive surface features include diffractive features of different pitches in non-overlapping regions of the major surface tailored to extract guided-mode light of different colors from the light guide in different directions. The diffractive features extract light such that an ordinary user observes substantially different colors in different regions of the light guide, providing a colorful appearance. Notwithstanding this, the diffractive features also extract light such that the lighting device illuminates a reference surface, disposed at an intermediate distance from the light guide, with illumination light that is substantially uniform in color and substantially white. Optical films having diffractive features that can be used to construct such devices and light guides are also disclosed. The concept can also be extended to embodiments in which the uniform color illumination light is not substantially white.

28 Claims, 18 Drawing Sheets

(56) References Cited

U.S. PATENT DOCUMENTS

| | | |
|---|---|---|
| 2007/0076417 A1 | 4/2007 | Yang |
| 2008/0037127 A1 | 2/2008 | Weber |
| 2008/0184636 A1 | 8/2008 | Fisher |
| 2009/0127849 A1 | 5/2009 | Kim |
| 2009/0181484 A1 | 7/2009 | Lee |
| 2010/0073958 A1* | 3/2010 | Stadtwald-Klenke ........ 362/606 |
| 2010/0079841 A1 | 4/2010 | Levola |
| 2010/0122329 A1 | 5/2010 | Jakobsson |
| 2010/0165660 A1 | 7/2010 | Weber |
| 2010/0238686 A1 | 9/2010 | Weber |
| 2011/0127637 A1 | 6/2011 | Chakravarti |
| 2011/0141395 A1* | 6/2011 | Yashiro .......................... 349/62 |
| 2011/0187964 A1 | 8/2011 | Li |
| 2011/0222295 A1 | 9/2011 | Weber |
| 2011/0242837 A1 | 10/2011 | Cornelissen |
| 2011/0274399 A1 | 11/2011 | Ben Bakir |
| 2011/0279997 A1 | 11/2011 | Weber |
| 2012/0057235 A1 | 3/2012 | Chang |
| 2012/0098421 A1 | 4/2012 | Thompson |
| 2012/0099323 A1 | 4/2012 | Thompson |
| 2012/0127751 A1 | 5/2012 | Kimmel |

FOREIGN PATENT DOCUMENTS

| | | |
|---|---|---|
| GB | 2340280 | 2/2000 |
| JP | 3045499 | 5/2000 |
| KR | 2009 0009443 | 9/2009 |
| WO | WO 2008/053078 | 5/2008 |
| WO | WO 2008/081071 | 7/2008 |
| WO | WO 2008/144644 | 11/2008 |
| WO | WO 2008/144656 | 11/2008 |
| WO | WO 2009/127849 | 10/2009 |
| WO | WO 2010/004187 | 1/2010 |
| WO | WO 2010/119426 | 10/2010 |
| WO | WO 2010/122329 | 10/2010 |
| WO | WO 2011/088161 | 7/2011 |
| WO | WO 2012/075352 | 6/2012 |
| WO | WO 2012/075384 | 6/2012 |

OTHER PUBLICATIONS

U.S. Appl. No. 13/572,806, Yang, filed Aug. 13, 2012, for Diffractive Lighting Devices With 3-Dimensional Appearance.

U.S. Appl. No. 13/572,813, Thompson, filed Aug. 13, 2012 for Lighting Devices with Patterned Printing of Diffractive Extraction Features.

U.S. Appl. No. 13/572,835, Thompson, filed Aug. 13, 2012, for Diffractive Luminaires.

* cited by examiner

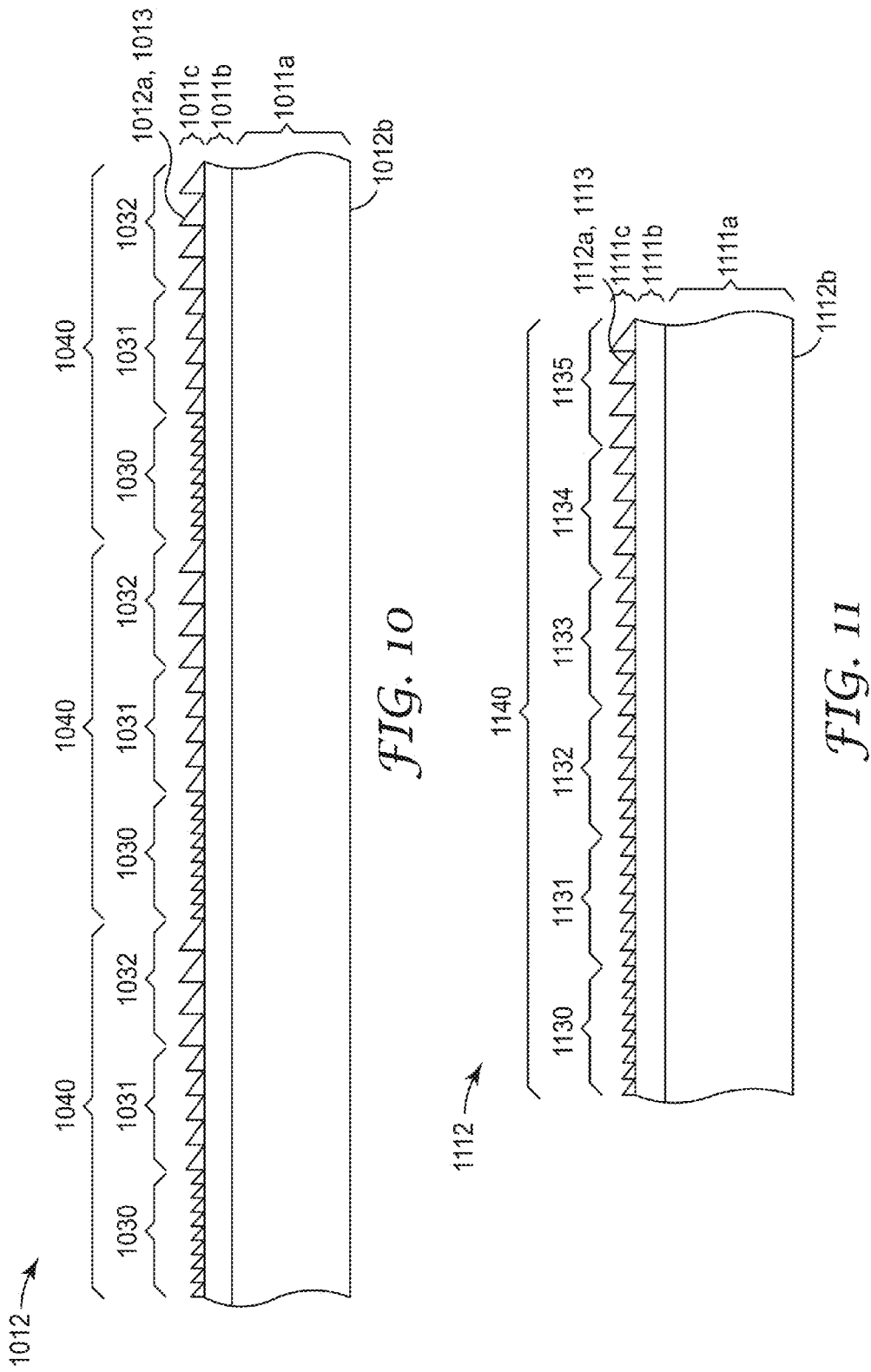

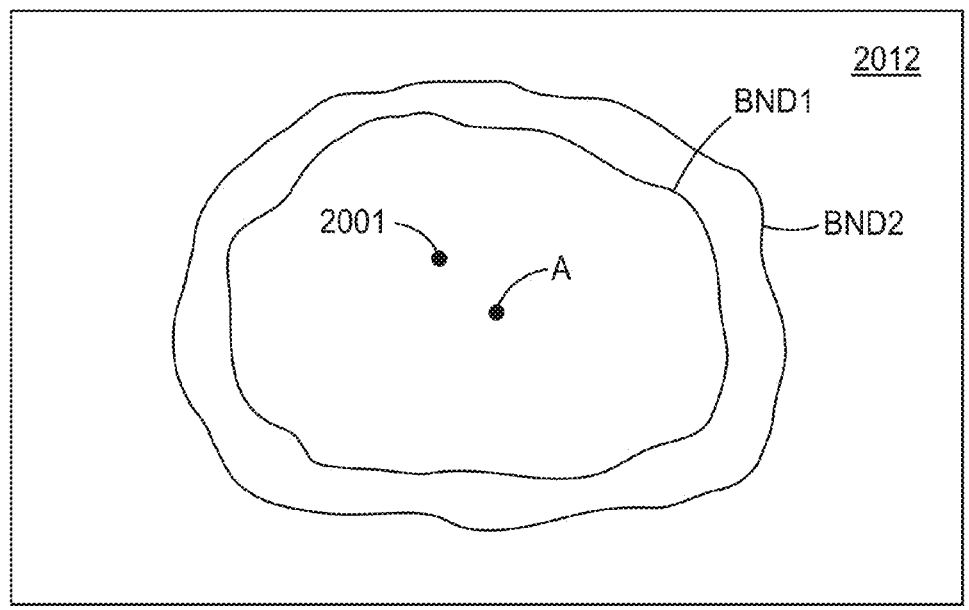
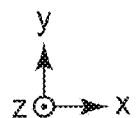
FIG. 20

COLORFUL DIFFRACTIVE LUMINAIRES PROVIDING WHITE LIGHT ILLUMINATION

FIELD OF THE INVENTION

This invention relates generally to lighting devices, with particular application to lighting devices that incorporate a light guide and diffractive elements to couple guided-mode light out of the light guide. The invention also relates to associated articles, systems, and methods.

BACKGROUND

Extended area lighting devices that use a light guide to spread light from discrete edge-mounted CCFL or LED light sources over the extended area of the light guide are known. Edge-lit backlights used in liquid crystal displays (LCDs) are a major example of such lighting devices. Ordinarily, it is important for such lighting devices to have a color and brightness that are uniform, or at least slowly varying, as a function of position on the extended area output surface. It is also ordinarily important for such lighting devices to emit light of a substantially white color, so that the filtering action of the liquid crystal panel can produce full color pixels and pictures ranging from blue through red.

In order to extract guided-mode light out of the light guide, edge-lit backlights often configure a major surface of the light guide to have a printed pattern of diffusive paint or other scattering material, or to have a structured surface e.g. as provided by a series of grooves or prisms whose facets are designed to change the direction of light by refraction or reflection. It is not common to extract guided-mode light out of the light guide using diffractive grooves or prisms on the major surface, because diffraction has a strong wavelength dependence which could easily produce a highly colored appearance, and a highly colored appearance is unacceptable in most end-use applications.

BRIEF SUMMARY

We have developed a new family of extended area lighting devices that extract light from an extended light guide using diffractive surface features on a major surface of the light guide. Light from one or more light sources is injected into the light guide, and the diffractive surface features interact with the injected light to couple guided-mode light out of the light guide. The diffractive surface features, which may include first, second, and third diffractive features in non-overlapping regions of the major surface, are tailored to extract guided-mode light from the light guide, e.g. as a function of the optical wavelength of the guided-mode light and position, such that an ordinary user of the device observes substantially different colors in different regions of the light guide. This provides the device with a colorful aesthetic appearance. Notwithstanding the colorful appearance, the devices are also utilitarian, because the diffractive features are also tailored to extract light such that the lighting device illuminates a reference surface of interest, disposed at an intermediate distance from the light guide, with light of a substantially uniform color. The substantially uniform color may be substantially white, or, in some cases a non-white color. The reference surface may be disposed along an optical axis of the light guide, at a distance D from the light guide, where D may be specified in terms of a characteristic transverse dimension L of the light guide, e.g., a maximum, minimum, or average transverse dimension.

Unless otherwise indicated, the maximum and minimum transverse dimensions of the light guide refer to caliper measurements, in which the entire light guide is considered to be placed between parallel blades of a sufficiently large caliper, the parallel blades of the caliper lying in the same plane as the light guide. The average transverse dimension of the light guide may then be the simple arithmetic average of the maximum and minimum transverse dimensions.

We have also developed lighting devices in which diffractive surface features on a major surface of a light guide include first diffractive surface features tailored to couple guided-mode light of a first color out of the light guide in a desired direction, e.g., parallel to the optical axis, and second diffractive surface features tailored to couple guided-mode light of a different second color out of the light guide in the same desired direction. The diffractive surface features may also include third diffractive surface features tailored to couple guided-mode light of a still different third color out of the light guide in the same desired direction. By appropriate selection of, among other things, the total surface areas of the major surface occupied by the first, second, and third diffractive surface features, and the spectral distribution of light emitted by the light source(s), a desired overall color of light emitted from the lighting device in the desired direction can be achieved. For example, substantially white light illumination can be achieved along the optical axis of the light guide.

The lighting devices can be used as luminaires for general lighting or decorative lighting. The diffractive surface features used in these devices can provide low optical distortion for non-guided-mode light that propagates through the light guide, to permit viewing of objects through the light guide.

We describe herein, inter alia, lighting devices such as luminaires that include a light guide and one or more light sources disposed to inject light into the light guide. The light guide has an optical axis and a first major surface, and the first major surface has a plurality of diffractive surface features therein adapted to couple guided-mode light out of the light guide. The plurality of diffractive surface features include diffractive surface features of different pitches. The diffractive surface features extract guided-mode light from the light guide such that an ordinary user of the luminaire observes substantially different colors in different regions of the light guide at a viewing geometry. Furthermore, the diffractive surface features and the light source(s) in combination are tailored to provide illumination of a substantially uniform color at a reference surface of interest perpendicular to the optical axis and separated from the light guide by an intermediate distance D.

The substantially uniform color may be substantially white, or it may be another desired color. For purposes of this application, light that is "substantially white" refers to an area on the CIE x,y chromaticity diagram whose boundary is defined by twelve color points: (0.305, 0.265), (0.29, 0.340), (0.330, 0.382), (0.375, 0.415), (0.425, 0.440), (0.470, 0.450), (0.530, 0.450), (0.530, 0.380), (0.470, 0.375), (0.425, 0.360), (0.375, 0.335), (0.340, 0.305).

The substantially different colors in different regions of the light guide may include at least two colors separated from each other on a CIE x,y chromaticity diagram by more than a first color difference. The first color difference may be 0.12, or 0.15, or 0.2.

The illumination on the reference surface may have a maximum value Imax, and the substantially uniform color may be characterized over a measurement portion of the reference surface at which the illumination provides an illuminance of at least Imax/e, where e is the mathematical constant equal to the base of the natural logarithm function. No two points within the measurement portion are separated from each other on the CIE x,y chromaticity diagram by more than a second color difference. The second color difference may be 0.08, or 0.07, or 0.06.

The distance D may be expressed in terms of a characteristic transverse dimension L of the first major surface of the light guide. Preferably, D is at least 2*L but no more than 50*L. The dimension L may be a maximum, minimum, or average in-plane dimension of the first major surface. Alternatively or in addition, D may be expressed in absolute units. Preferably, D is at least 0.2 meters but no more than 15 meters.

In some cases, each of the one or more light sources emits substantially white light.

The plurality of diffractive surface features may include one or more first packets of first diffractive surface features having a first pitch, and one or more second packets of second diffractive surface features having a second pitch different from the first pitch. The plurality of diffractive surface features may also include one or more third packets of third diffractive surface features having a third pitch different from the first and second pitches. The one or more first packets may occupy a first total area of the light guide, the one or more second packets may occupy a second total area of the light guide, and the one or more third packets may occupy a third total area of the light guide, and relative proportions of the first, second, and third total areas may be related to a spectral intensity distribution of the one or more light sources. The first pitch may be tailored to extract blue light parallel to the optical axis, the second pitch may be tailored to extract green light parallel to the optical axis, and the third pitch may be tailored to extract red light parallel to the optical axis.

The one or more first packets may include a plurality of first packets, wherein the one or more second packets may include a plurality of second packets, and the one or more third packets may include a plurality of third packets. The first, second, and third packets may be arranged in repeating groups on the first major surface of the light guide. Furthermore, each of the first, second, and third diffractive surface features may include surface features that, in plan view, extend along a plurality of in-plane directions. Each of the first, second, and third diffractive surface features may include surface features that, in plan view, are substantially circular in shape.

We also disclose luminaires in which the substantially uniform color at the reference surface of interest is any desired color, including substantially white or a non-white color.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIGS. 10 and 11 are schematic side or sectional views of light guides with diffractive surface features, the diffractive surface features including groups of surface features of different pitches;

FIG. 20 is a schematic plan view of an illuminated measurement portion of a reference surface of interest;

In the figures, like reference numerals designate like elements.

DETAILED DESCRIPTION OF ILLUSTRATIVE EMBODIMENTS

We have found that lighting devices such as luminaires can be made using extended area light guides, diffractive surface features, and discrete light sources, to provide general purpose illumination in a device that can also be aesthetically pleasing. The characteristics of diffractive surface features such as diffraction gratings that cause them to spread light out as a function of wavelength, thus producing a multicolored appearance which is entirely unacceptable in many applications such as backlights for electronic displays, can be exploited to provide a colorful (e.g. rainbow-like) aesthetic appearance. At the same time, design features of diffractive surface features can be tailored, in combination with light sources used to inject light into the light guide, so that the lighting device provides illumination of a substantially uniform color at a reference surface of interest perpendicular to an optical axis of the light guide, the reference surface being disposed at an intermediate distance D from the light guide. The uniform color at the reference surface may be substantially white, or it may be non-white in color. The color uniformity at the reference surface may be specified over an area or measurement portion whose boundary is defined by a threshold illuminance, such as 1/e of the maximum illuminance at the reference surface.

Design features that can be used to tailor the color or spectral content of the illumination at the surface of interest include: the pitch of the diffractive surface features; the orientation(s) or shape(s), from a plan view perspective, of the diffractive surface features, e.g., linear versus curved; the cross-sectional profile of the individual prisms making up the diffractive surface features; the refractive index of such prisms, and the refractive index of the optical medium (in some cases, air) that they are exposed to; in cases where the diffractive surface features are composed of distinct groups or packets of diffractive features having a common pitch, the physical widths of such packets; relative total areas occupied by diffractive surface features of different pitches; and the spectral distribution of all light sources used to inject light into the light guide. These design features will now be discussed, in the context of lighting devices useful as luminaires to provide illumination.

Figure 1:
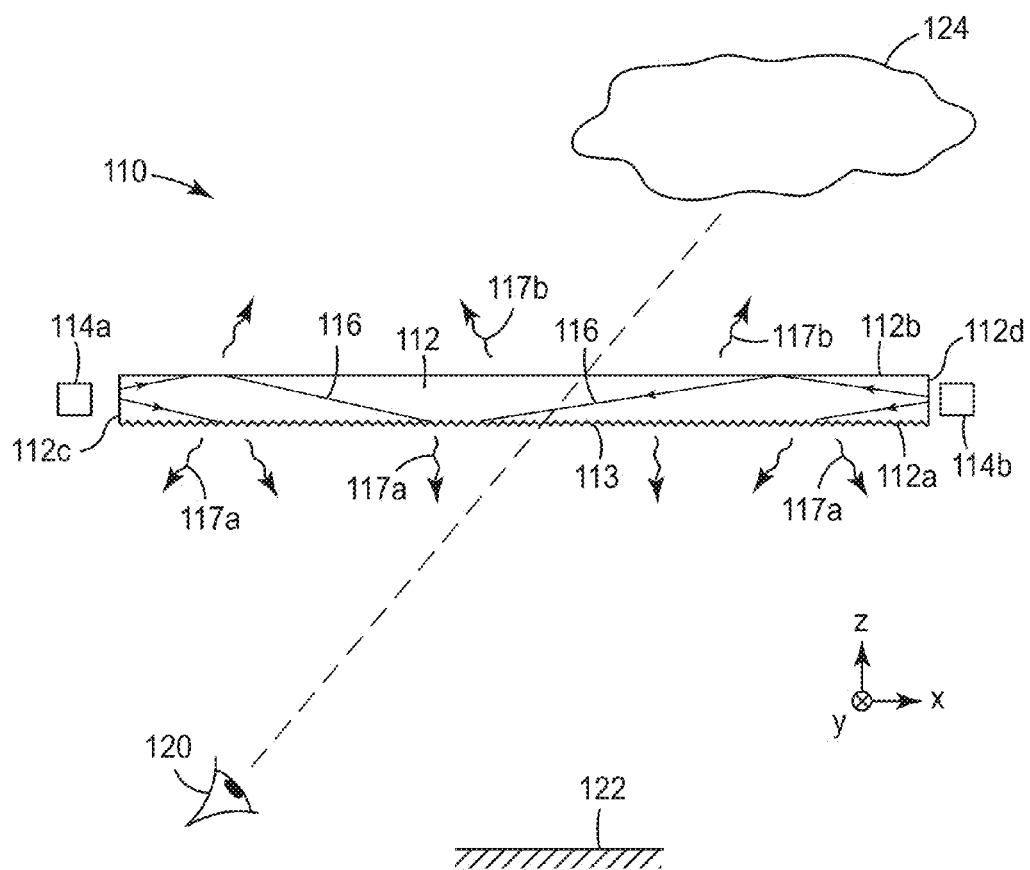
FIG. 1 is a schematic side or sectional view of a lighting device utilizing diffractive surface features on a major surface of a light guide.

An exemplary lighting device 110 is shown in schematic side or sectional view in FIG. 1. The lighting device 110 includes an extended area light guide 112 and discrete light sources 114a, 114b. The lighting device 110 may be mounted in any desired configuration but in this case it is shown mounted physically above the user 120, e.g. in or near a ceiling of a room or building. The device 110 may provide substantially uniform white light illumination on a surface 122 such as a tabletop or floor. However, when the user 120 looks directly at the device 110, the user may see a pattern of substantially different colors across the emitting area of the device 110. The pattern of colors is due at least in part to guided-mode light of different wavelengths or colors being extracted from the light guide by the diffractive surface features at different angles, or, more precisely, in different angular distributions.

When looking directly at the device 110, the user may also see one or more bands having a 3-dimensional appearance in the emitting area of the device. A given band is the result of the interaction of light emitted from one of the discrete light sources and diffractive surface features on one or both major surfaces of the light guide. Alternatively, a given band may be the result of the interaction of light reflected or absorbed by a localized region of high or low reflectivity in a non-uniform reflective structure extending along a side surface of the light guide. Details of such bands are described in commonly assigned U.S. patent application Ser. No. 13/572,805, "Diffractive Lighting Devices With 3-Dimensional Appearance", filed Aug. 13, 2012.

The user may also in some cases see indicia or other spatial patterns in the emitting area of the device resulting from the patterned printing of the diffractive surface features. The patterned printing provides a second light transmissive medium in optical contact with some diffractive surface features on at least one major surface of the light guide. Other diffractive surface features on the same major surface are in optical contact with a different first light transmissive medium. Details of such indicia are described in commonly assigned U.S. patent application Ser. No. 13/572,813, "Lighting Devices With Patterned Printing of Diffractive Extraction Features", filed Aug. 13, 2012.

In addition to the pattern of colors, the indicia, and the bands in the emitting area of the device, the user 120 may also observe objects such as object 124 through the light guide 112 with little or no optical distortion. Light emitted by or reflected by such objects is able to propagate through the light guide as non-guided-mode light, only a small amount of which is deflected by the diffractive surface features.

The light guide 112 is extended along two in-plane directions, shown in FIG. 1 as an x- and y-axis of a Cartesian coordinate system, so that the light guide has opposed major surfaces 112a, 112b, as well as side surfaces 112c, 112d. Diffractive surface features 113 are provided on at least one of the major surfaces of the light guide 112, such as surface 112a as shown in the figure, or in other embodiments surface 112b, or both surfaces 112a and 112b. In any case, the diffractive surface features are tailored to couple guided-mode light out of the light guide by diffraction. The guided-mode light is shown in the figure as light 116, and out-coupled light emitted from the light guide is shown as light 117a, 117b. Light 117a passes through the surface 112a in the general direction of the user 120 or surface 122, and light 117b passes through the surface 112b in the general direction away from the user 120 or surface 122. In some cases the lighting device 110 may be mounted so that the light 117b provides indirect illumination to the room, e.g. by redirecting the light 117b back into the room by reflection from the ceiling or from another reflective member.

In this regard, a reflective film or layer may be applied to all or a portion of the surface 112b, or it may be positioned near the surface 112b, so as to redirect the light 117b so it emerges from the surface 112a. The reflective film may reflect light diffusely, specularly, or semi-specularly, and may reflect light uniformly or non-uniformly as a function of wavelength, and it may reflect normally incident light uniformly or non-uniformly as a function of polarization. The reflective film may for example be or comprise: white paint or paints of any other color; high reflectivity mirror films, e.g., films with metal coatings such as aluminum, silver, nickel, or the like, or non-metallic mirror films such as 3M™ Vikuiti™ ESR; multilayer optical films having organic (e.g. polymeric) or inorganic constituent optical layers with a layer thickness profile tailored to reflect light over some or all of the visible spectrum at normal incidence or at another desired incidence angle; ESR films with diffuse coatings; white reflectors having glossy surfaces; reflectors with brushed metal surfaces, including films with metal coatings whose surface is roughened to provide semi-specular or diffuse reflectivity; reflectors with structured surfaces; microcavitated PET films; 3M™ Light Enhancement Films; and/or reflective polarizing films, including but not limited to Vikuiti™ Diffuse Reflective Polarizer Film (DRPF), Vikuiti™ Dual Brightness Enhancement Film (DBEF), Vikuiti™ Dual Brightness Enhancement Film II (DBEF II), and multilayer optical films having different reflectivities for normally incident light of different polarizations but an average reflectivity of greater than 50% for such normally incident light, over some or all of the visible spectrum. See also the optical films disclosed in: US 2008/0037127 (Weber), "Wide Angle Mirror System"; US 2010/0165660 (Weber et al.), "Backlight and Display System Using Same"; US 2010/0238686 (Weber et al.), "Recycling Backlights With Semi-Specular Components"; US 2011/0222295 (Weber et al.), "Multilayer Optical Film with Output Confinement in Both Polar and Azimuthal Directions and Related Constructions"; US 2011/0279997 (Weber et al.), "Reflective Film Combinations with Output Confinement in Both Polar and Azimuthal Directions and Related Constructions"; WO 2008/144644 (Weber et al.), "Semi-Specular Components in Hollow Cavity Light Recycling Backlights"; and WO 2008/144656 (Weber et al.), "Light Recycling Hollow Cavity Type Display Backlight".

The light guide 112 may be physically thick or thin, but it is preferably thick enough to support a large number of guided modes and furthermore thick enough to efficiently couple to the emitting area of the discrete light sources. The light guide may, for example, have a physical thickness in a range from 0.2 to 20 mm, or from 2 to 10 mm. The thickness may be constant and uniform, or it may change as a function of position, as with a tapered or wedged light guide. If tapered, the light guide may be tapered in only one in-plane direction, e.g. either the x- or the y-axis, or it may be tapered in both principal in-plane directions.

The light guide may be substantially flat or planar, ignoring small amplitude surface variability associated with, e.g., diffractive surface structures. In some cases, however, the light guide may be non-flat, including simply curved, i.e., curved along only one principal in-plane direction, or complex curved, i.e., curved along both principal in-plane directions. The light guide may be entirely flat, entirely non-flat, or flat in some areas and non-flat in other areas. For light guides that are non-flat along a particular in-plane direction, the cross-sectional profile along such a direction may be, for example, a simple arc, or more complex non-straight contours. In some cases the light guide may deviate greatly from a flat structure, e.g., the light guide may be in the form of a solid or a hollow truncated hollow cone, wherein light injection can occur at the large end or the small end of the truncated cone, as desired.

Whether or not the light guide 112 is flat, the light guide may have an outer boundary or edge whose shape, when the light guide is seen in plan view, is curved, or piecewise flat (polygonal), or a combination of piecewise flat and curved. Examples of curved shapes are shapes with continuous arcs, such as circles, ovals, and ellipses, and shapes with discontinuous or undulating arcs, such as a sinusoid or sinusoid-like contour. Examples of piecewise flat shapes are triangles, quadrilaterals (e.g., squares, rectangles, rhombuses, parallelograms, trapezoids), pentagons, hexagons, octagons, and so forth. The piecewise flat shapes can provide a straight or flat side surface or edge for light injection from the discrete light sources, while curved shapes provide curved side surfaces for light injection.

The light guide is typically relatively rigid and self-supporting so that it does not substantially bend or deform under its own weight, but flexible light guides can also be used and may, if desired, be held in place using a support structure or frame, for example. The light guide may have a unitary construction, or it may be made from a plurality of components attached to each other with no significant intervening air gaps, e.g., a thin structured surface film attached to a flat, smooth major surface of a thicker plate using a clear optical adhesive.

The light guide may be made of any suitable low loss light-transmissive material(s), such as glasses, plastics, or combinations thereof. Materials that are low loss, e.g., low absorption and low scattering over visible wavelengths, are desirable so that guided-mode light can propagate from one side surface completely across the light guide with absorption/scattering losses that are small compared to losses due to out-coupling of such light by the diffractive surface features. Exemplary materials include suitable: glasses; acrylics; polycarbonates; polyurethanes; cyclo-olefin polymer/copolymers, including Zeonex™ and Zeonor™ materials sold by Zeon Chemicals L.P, Louisville, Ky.; silicones and elastomers; and pressure sensitive adhesives (PSAs) and other adhesives, including silicone adhesives, 3M™ VHB™ conformable acrylic foam tapes, and 3M™ OCA™ optically clear adhesives.

The device 110 also includes one or more discrete light sources 114a, 114b, which are preferably mounted at an edge or side surface of the light guide 112. The sources are discrete and small in size relative to the in-plane dimension (length or width) of the light guide. However, light sources that are discrete or limited in size need not be used, and may be replaced if desired with non-discrete light sources, including light sources whose emitting area is long and/or wide with respect to corresponding dimensions of the side surface of the light guide. The sources 114a, 114b are preferably solid state light sources such as light emitting diodes (LEDs), but other suitable light sources can also be used.

In this regard, "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultra-violet or short wavelength visible LED die, and fluoresce at one or more wavelengths in the visible spectrum. An "LED" for purposes of this application should also be considered to include organic light emitting diodes, commonly referred to as OLEDs.

Light emitted by the sources such as sources 114a, 114b is injected into the light guide to provide guided-mode light, i.e., light that is predominantly trapped in the light guide by total internal reflection (TIR), ignoring the effect of any diffractive surface features. The light emitted by each individual source is visible, and may be broad band (e.g. white) or narrow band (e.g. colored such as red, yellow, green, blue). If colored narrow band sources are used, different colors can be combined to provide an overall white light illumination on the surface 122, or the colors can be uniform, or different from each other but combined in such a way as to provide a decorative colored (non-white) illumination on the surface 122.

Diffractive surface features 113 are provided on at least one major surface of the light guide. These surface features or structures may be exposed to air, or planarized with a tangible material such as a low refractive index material, or both (some exposed to air, some planarized) in a patterned arrangement. As discussed elsewhere herein, the diffractive surface features are sized and otherwise configured to couple guided-mode light out of the light guide by diffraction, such that different wavelengths are coupled out differently, e.g. in different amounts, different directions, and different angular distributions. The diffractive surface features may be tailored so that light from the edge-mounted light sources is emitted substantially equally from both major surfaces 112a, 112b of the light guide, or instead so that the light is preferentially emitted from one of the major surfaces, such as surface 112a, which may then be designated the output surface of the light guide. In the latter case, the device may be mounted in a specific orientation so as to efficiently illuminate a room, workspace, or other surface of interest.

Although the diffractive surface features couple guided-mode light out of the light guide, the light guide and the diffractive surface features are preferably tailored so that non-guided-mode light, e.g., light originating from a source or object behind the light guide and incident on one of the major surfaces of the light guide, is minimally deviated (whether by diffraction or refraction) such that objects can be viewed through the light guide with low distortion. The low distortion may provide both aesthetic and utilitarian benefits. In FIG. 1, the distortion is low enough so that the user 120 can view and recognize the object 124 through the light guide 112. The object 124 may be the ceiling or another neighboring structure which neither generates light nor is part of the lighting device 110. Alternatively, the object 124 may generate light and may be a part of the lighting device 110, for example, it may be another edge-lit light guide with its own diffractive surface features, or it may be a more conventional light source such as a spotlight or light bulb with no diffractive surface features but connected to the light guide 112 and mounted such that most or at least some of the light it emits is directed through the light guide 112. Furthermore, the object 124 may be or include a graphic film disposed near or attached to the device 110.

The diffractive surface features 113 may be present over substantially all of the major surface 112a, or only a portion of the surface. If the diffractive surface features cover only certain portions of the surface, light from the edge-mounted light sources may be emitted from the light guide only in those portions.

Additional aspects of the diffractive surface features are discussed further below. One particularly noteworthy aspect is selection of diffractive surface features in combination with light sources that yield a lighting device wherein an ordinary user of the device observes substantially different colors in different regions of the light guide, for a colorful aesthetic appearance, while at the same time providing illumination of a substantially uniform color (e.g. a uniform white color) at a reference surface of interest disposed perpendicular to an optical axis of the light guide and at an intermediate distance D from the light guide. The distance D may be expressed in terms of a characteristic in-plane dimension L of the light guide. For example, D may be at least 2*L but no more than 50*L, and L may be a maximum, minimum, or average in-plane dimension of the light guide. The distance D may additionally or alternatively be at least 0.2 meters but no more than 15 meters. The colorful appearance may be provided even in cases where every light source disposed to inject light into the light guide emits substantially white light. Even in cases where every such light source does not emit substantially white light, the colorful appearance is still preferably a substantial result of the diffraction of different wavelengths of extracted light by the diffractive surface features in different directions.

In some cases, at least some of the diffractive surface features may optionally be non-straight in plan view, and light propagating within the light guide may interact with the diffractive surface features to produce at least one band that intersects the non-straight diffractive surface features. The band may be a bright band, or, in some cases, a dark band. The band changes in appearance (e.g. shape) as a function of the viewing position of an observer 120 relative to the lighting device 110. The non-straight diffractive features may be, for example, curved or segmented in shape, or may have an undulating or disjointed shape comprising curves and/or segments. However, in some cases, some or all of the diffractive surface features on one or both of the major surfaces of the light guide may be straight in plan view. Bright and/or dark bands can also be generated with the straight diffractive surface features when discrete light sources and/or discrete absorbers are used, but the shapes of such bands may not change curvature as a function of viewing position.

The lighting device 110, and the other lighting devices disclosed herein, can be used as a luminaire or similar lighting device for general illumination purposes or the like. The luminaire may be mounted in any desired position and orientation, e.g., on, within, or near a ceiling of a room, or on, within, or near a wall of a room, or mounted on a post, stand, or other support structure. The luminaire may be oriented parallel to the ceiling, or parallel to the wall, or at an oblique or intermediate angle with respect to the ceiling or wall.

Figure 2:
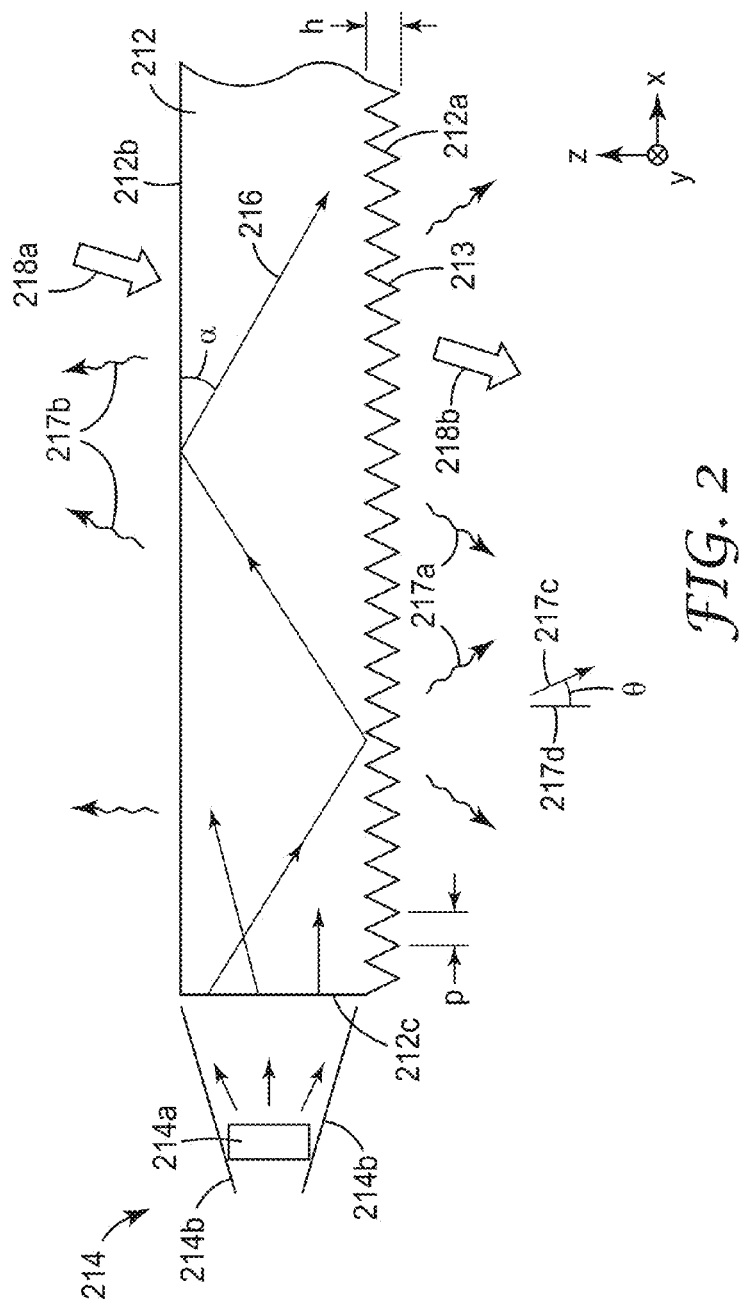
FIG. 2 is a schematic side or sectional view of a light guide with a discrete light source injecting light into the light guide and diffractive surface features coupling guided-mode light out of the light guide.

In FIG. 2, we see a schematic view of a light guide 212 with a light source such as a discrete light source 214 injecting light into the light guide, and diffractive surface features 213 coupling guided-mode light 216 out of the light guide to provide out-coupled light 217a, 217b. The light guide 212, which may be the same as or similar to the light guide 112 discussed above, has a first major surface 212a on which the diffractive surface features 213 are provided, a second major surface 212b opposite the first major surface, and a side surface 212c through which light from the light source 214 can enter the light guide. The light source 214 may include an active element 214a such as one or more LED dies which convert electricity into visible light, and one or more reflective members 214b which help direct some of the misdirected light from the element 214a into the side surface 212c of the light guide 212. Guided-mode light 216 from the light source 214 propagates via total internal reflection (TIR) along and within the light guide 212 over a range of angles α which may be measured relative to the local plane of the light guide, in this case, the x-y plane. Out-coupled light 217a, 217b may be measured or characterized, at least in part, by the polar angle θ between the direction of propagation of a given light ray 217c and an axis 217d normal to the local plane of the light guide, in this case, the z-axis. FIG. 2 also shows an incident light beam 218a impinging upon and entering the light guide 212 through the major surface 212b, propagating through the light guide 212 as non-guided-mode light, and exiting the light guide through the major surface 212a as transmitted light beam 218b. The transmitted beam 218b is preferably minimally deviated by the diffractive surface features 213 such that objects can be viewed through the light guide 212 with low distortion.

We will now elaborate on relevant design characteristics of the diffractive surface features 213 that allow them to provide the functional properties discussed above. Typically, the diffractive surface features 213 are grooves or ridges/prisms with well-defined faces that follow predetermined paths in plan view. For purposes of FIG. 2, we will assume for simplicity that the diffractive features 213 follow straight, linear paths that are parallel to each other and to the y-axis. This assumption is not as restrictive as it seems, because the straight, linear features can approximate a very small portion or section of diffractive surface features that follow curved paths in plan view, such as concentric circles or spiral arcs. We also assume for simplicity that the diffractive features 213 have a uniform center-to-center spacing known as "pitch", which is labeled "p" in FIG. 2. This assumption is also not as restrictive as it seems, because the uniformly spaced diffractive features 213 can approximate a very small portion or section of diffractive surface features whose pitch p changes as a function of position. The diffractive surface features 213 are also assumed to have a depth (grooves) or height (prisms) "h" as shown in FIG. 2.

The diffractive surface features 213 with the assumed linear configuration and constant pitch can be referred to as a single-pitch (or periodic) one-dimensional (1D) diffraction grating. The single-pitch 1D grating is directly coupled to, and forms the major surface 212a of, the light guide 212, which we assume has a refractive index of n and is immersed in air or vacuum. Light from the light source 214 of optical wavelength λ is injected or launched into the light guide 212 through the side surface 212c, and propagates primarily by TIR within and along the light guide as guided-mode light 216. When such light impinges upon and interacts with the diffractive surface features 213, a fraction (η) of the guided-mode light 216 is extracted as out-coupled light 217a, 217b. The out-coupled or extracted light 217a, 217b propagates along a direction that is orthogonal to the light guide surface (e.g. having a polar angle θ=0 in FIG. 2) when the following condition is met:

$$m \times (\lambda/n) = d \times \cos(\alpha). \quad (1)$$

In this equation: α refers to the angle at which the guided-mode light impinges on the grating surface, measured relative to the plane of the surface substantially as shown in FIG. 2; m is the diffraction order; n is the refractive index of the light guide 212; λ is the wavelength of light; and d is the grating pitch, which is labeled "p" in FIG. 2. For example, for green light with λ=530 nm launched on-axis (α=0 degrees) into an acrylic light guide having a refractive index n=1.5, the grating pitch d (or p) should equal 353 nm, and only the first diffraction order (m=1) is possible. For other values of α and λ, the extraction direction will in general no longer be orthogonal to the light guide surface.

A computer simulation can be used here to illustrate the angular distribution characteristics of extracted or out-coupled light as a function of the light source wavelength, for the single-pitch 1D diffraction grating. In order to fully characterize the angular distribution, both polar angle (angle θ in FIG. 2) and azimuthal angle (the angle measured in the x-y plane relative to a fixed direction or axis in the x-y plane) should be considered. For purposes of the simulation, for simplicity, we assume: that the light source 214 and the light guide 212 (including the diffractive surface features 213) extend infinitely along axes parallel to the y-axis; that the pitch d (or p) is 353 nm; and that the light source 214 has a Lambertian distribution in the x-z plane, i.e., an intensity proportional to the cosine of α, for light emitted by the light source 214 in air before impinging on the side surface 212c. After running the simulation with these assumptions, we calculate the total integrated optical power density as a function of the polar angle θ for 3 different optical wavelengths λ, and plot the results in FIG. 3. In that figure, curves 310, 312, 314 show the integrated optical power density for the optical wavelengths λ of 450 nm (blue light), 530 nm (green light), and 620 nm (red light), respectively.

Figure 3:
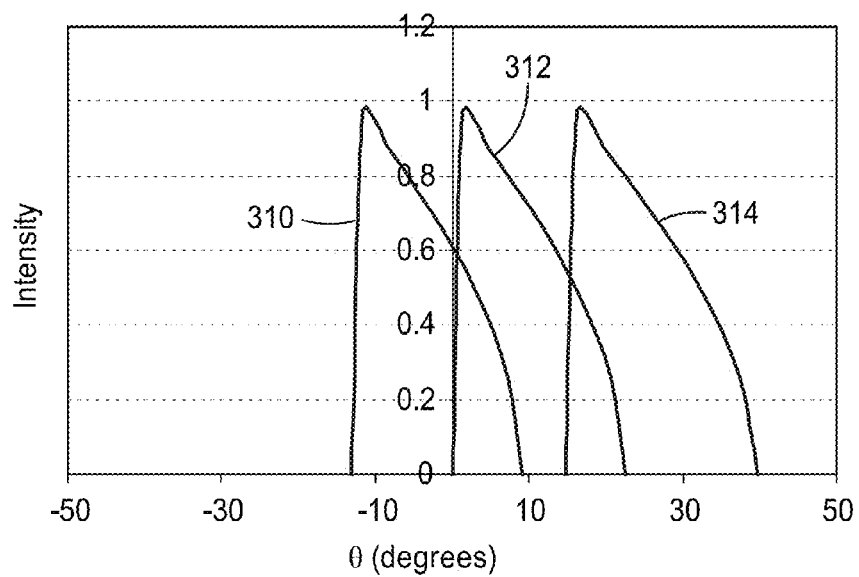
FIG. 3 is a graph of intensity versus polar angle of integrated optical power density for light extracted from a light guide using linear diffractive surface features.

The simulated results of FIG. 3 demonstrate, among other things, the wavelength-dependent nature of light extraction using diffractive surface features. Although the curves 310, 312, 314 overlap to some extent, their peak intensities occur at polar angles that differ from each other by more than 10 degrees, with the red and blue peaks being separated by almost 30 degrees. In this particular example, the peak for green light occurs close to θ=0, i.e., along a direction nearly coincident with the optical axis of the light guide. We can cause the peak for red light to coincide with the optical axis by increasing the pitch p, and we can cause the peak for blue light to coincide with the optical axis by decreasing the pitch p.

In addition to the simulation, we also fabricated a single-pitch 1D diffraction grating to demonstrate its utility as a light extractor for a light guide. First, a diamond tip for a diamond turning machine (DTM) was shaped using a focused ion beam (FIB) to form a V-shaped diamond tip with an included angle of 45 degrees. This diamond tip was then used to cut symmetric, equally spaced V-shaped grooves around the circumference of a copper roll to make a diffraction grating master tool. A cast-and-cure replication process was then used to transfer the grating pattern from the master tool to a film substrate. A triacetate cellulose (TAC) film having a thickness of 3 mils (about 76 micrometers) was used as a base film or substrate due to its low birefringence and its refractive index value (n=1.5), which matches well to the refractive index of typical light guide materials. This base film was applied to the master tool with a thin acrylate resin coating therebetween. The acrylate resin composition comprised acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). Ultraviolet light from a mercury vapor lamp ("D" bulb) was used for both casting and post-curing the microreplicated resin on the base film. The casting roll temperature was set at 130 degrees F. (54 degrees C.), and the nip pressure was set at 20 to 25 psi (about 138,000 to 172,000 pascals).

Figure 4:
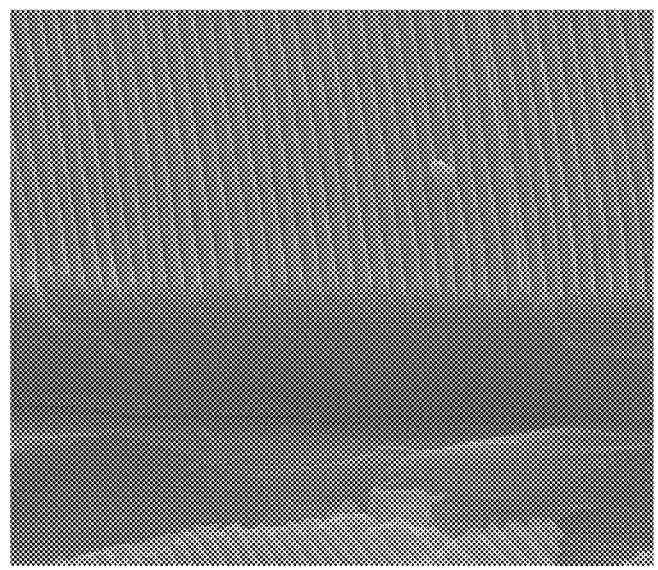
FIG. 4 is a micrograph of a replicated diffractive surface useful for light extraction from a light guide.

A microphotograph of the structured or grooved surface of the resulting diffraction grating film is shown in FIG. 4. The pitch of the diffractive surface features in this figure is about 400 nanometers, and the depth of the grooves (or height of the prisms) is about 500 nanometers.

This film was then laminated to a 2 mm thick acrylic plate, which was clear, flat, and rectangular, using a layer of optically clear adhesive (3M™ Optically Clear Adhesive 8172 from 3M Company, St. Paul, Minn.) such that the diffraction grating faced away from the acrylic plate and was exposed to air, and such that no significant air gaps were present between the base film of the diffraction grating film and the flat major surface of the acrylic plate to which the film was adhered. The laminated construction thus formed a light guide having the single-pitch 1D diffraction grating serving as diffractive surface features on one major surface of the light guide. The light guide included a flat, straight side surface extending parallel to the groove direction of the diffractive surface features, similar to the configuration of FIG. 2. A light source was constructed using a linear array of orange-emitting LEDs (obtained from OSRAM Opto Semiconductors GmbH), each LED having a center wavelength of about 590 nm and a full-width-at-half-maximum (FWHM) bandwidth of about 20 nm. The discrete character of the individual LEDs was masked by placing a diffuser plate (type DR-50 from Astra Products Inc., Baldwin, N.Y.) in front of the LEDs, i.e., between the LEDs and the side surface of the light guide, to provide illumination that was more spatially uniform. The light source thus approximated a linear light source emitting light that was approximately monochromatic at a wavelength of 590 nm.

Figure 5:
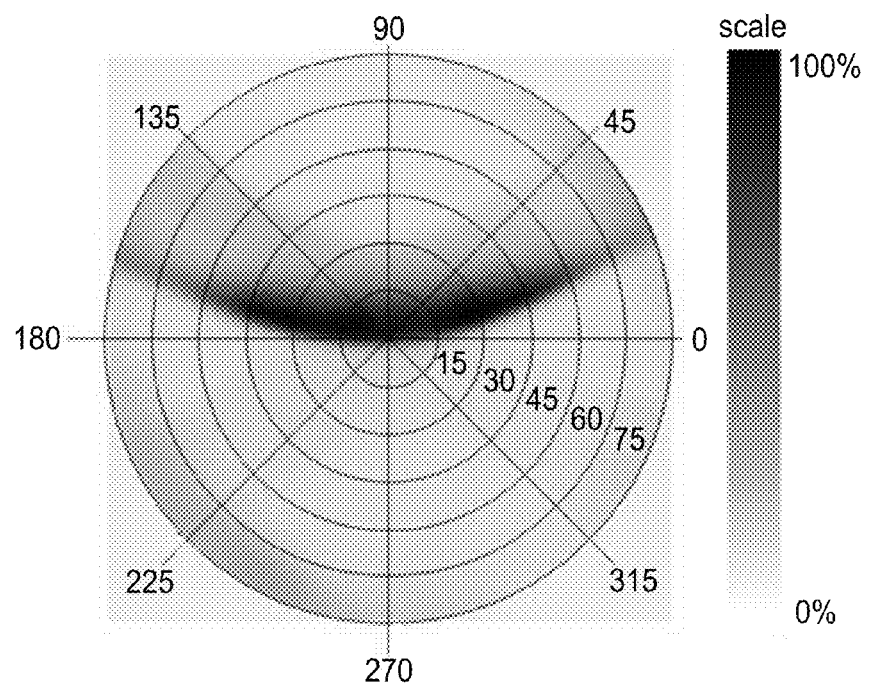
FIG. 5 is a conoscopic plot of measured intensity as a function of polar and azimuthal angle for a lighting device that used diffractive surface structures as shown in FIG. 4.

The light source was energized, and the intensity of the out-coupled light emitted through the diffractive surface features was measured as a function of polar angle and azimuthal angle using a conoscopic camera system. The measured conoscopic intensity distribution is shown in FIG. 5. In this figure, the direction of elongation of the light source, and the groove direction, corresponds to azimuthal values of 0 and 180 degrees. The measured intensity or luminance in an orthogonal reference plane, i.e., in a plane corresponding to azimuthal values of 90 and 270 degrees in FIG. 5, is plotted as a function of polar angle θ in FIG. 5a. The reader may note the similarity of the curve in FIG. 5a relative to the shape of the curves 310, 312, 314 in FIG. 3. The reader may also note in reference to FIG. 5 that light is extracted by the 1D diffraction grating in a narrow crescent-shaped distribution that does not lie in a plane, but that shifts in azimuthal angle as a function of polar angle.

Other aspects of the extended area lighting device discussed in connection with FIGS. 4, 5, and 5a include: light is extracted or out-coupled equally from both major surfaces of the light guide (see e.g. surfaces 212a, 212b of FIG. 2), which is a result of the symmetric design of the diffractive surface features (i.e., the symmetric V-shaped grooves that form the linear diffraction grating); if the monochromatic source is replaced with a white light source and/or multi-colored light sources, angular color separation will occur as a result of the diffraction phenomenon (see e.g. FIG. 3); no diffuser component is needed in the device (although in the embodiment of FIGS. 5 and 5a one is included in the light source to mask the discrete nature of the LED light sources) due to the fact that TIR is relied upon to allow the guided-mode light to propagate along the waveguide, and diffraction is relied upon to extract or out-couple the light from the light guide; and the crescent-shaped distribution of out-coupled light is characterized by a relatively narrow light extraction angle.

Figure 6:
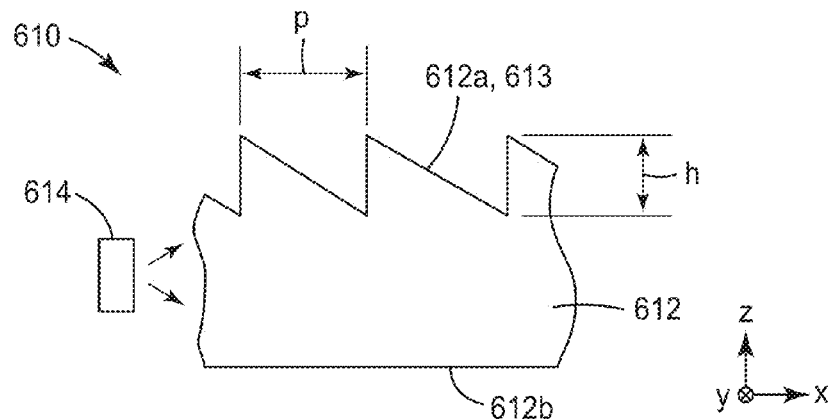
FIG. 6 is a schematic side or sectional view of a light guide having asymmetric or blazed diffractive surface structures.

Guided-mode light may be extracted or out-coupled preferentially through one major surface of the light guide rather than the other major surface by changing the shape of the diffractive surface features, in particular, making the shape of the individual features (e.g. prisms) asymmetrical. We demonstrate this in connection with FIGS. 6 and 7. In FIG. 6, a lighting device 610 includes a light guide 612 having a first major surface 612a and an opposed second major surface 612b. The first major surface 612a comprises diffractive surface features 613 in the form of facets which form right-angle prism structures of height "h" and pitch "p". The device 610 also includes a light source 614 disposed proximate a side surface of the light guide 612 to inject light into the light guide as guided-mode light, such light propagating generally from left to right from the perspective of FIG. 6. A computer simulation of the device 610 was performed. In the simulation, for simplicity, the prism structures of the diffractive surface features 613 were assumed to be equally spaced, and extending linearly along axes parallel to the y-axis. The light source was also assumed to extend linearly parallel to the y-axis, and was assumed to emit polarized light of wavelength λ into air in a Lambertian distribution in a first reference plane parallel to the plane of the light guide (see the x-y plane in FIG. 2), this light then being refracted at the side surface of the light guide. The simulation assumed only one propagation angle of light, α=5 degrees as referenced in FIG. 2, in a second reference plane (see the x-z plane in FIG. 2) perpendicular to the first reference plane. The refractive index of the light guide was assumed to be 1.5. The optical wavelength λ and the grating pitch p were initially selected such that the out-coupled light was extracted orthogonal to the light guide surface for first order diffraction (m=1), which yielded λ≈520 nm and p≈350 nm. The grating height h was then varied over a range from 50 to 500 nm, while the pitch p was held constant at 350 nm. For each embodiment associated with a specific value for the grating height, the following quantities were calculated by the computer simulation software:

extraction efficiency for transverse magnetic (TM) polarized light extracted from the first major surface 612a, referred to here as TM-top extraction efficiency;

extraction efficiency for transverse electric (TE) polarized light extracted from the first major surface 612a, referred to here as TE-top extraction efficiency;

extraction efficiency for transverse magnetic (TM) polarized light extracted from the second major surface 612b, referred to here as TM-bottom extraction efficiency; and extraction efficiency for transverse electric (TE) polarized light extracted from the second major surface 612b, referred to here as TE-bottom extraction efficiency.

In this regard, "extraction efficiency" refers to the amount (expressed as a percentage) of specified light (TM or TE) extracted from the specified major surface (612a or 612b) for a single interaction, divided by the amount of such specified light propagating within the light guide immediately before the interaction of the light beam with the extraction surface.

Figure 7:
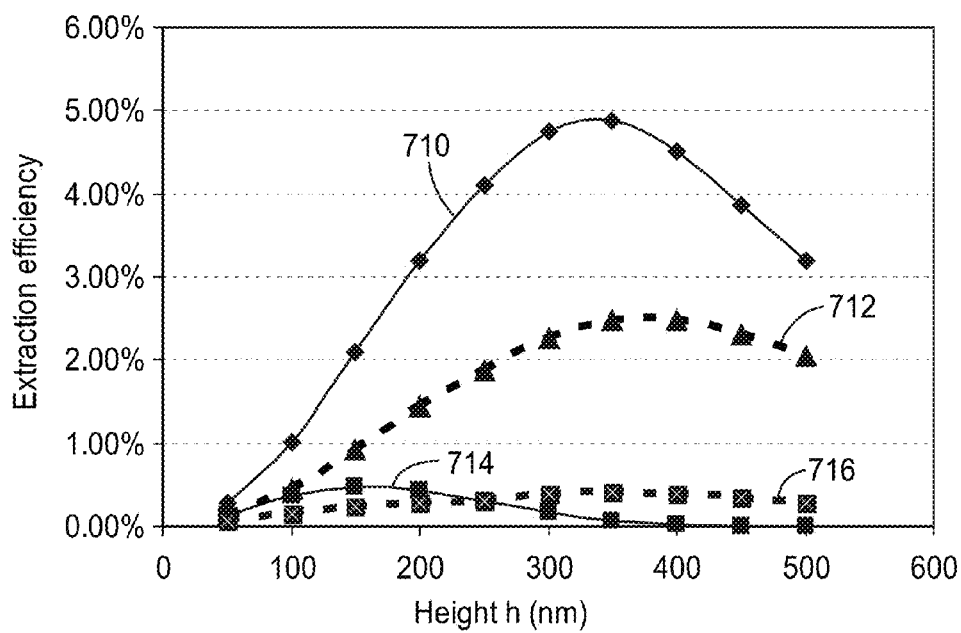
FIG. 7 is a graph of calculated extraction efficiency for the surface structures of FIG. 6.

The calculated quantities are plotted in FIG. 7, where curve 710 is the TM-bottom extraction efficiency, curve 712 is the TE-bottom extraction efficiency, curve 714 is the TM-top extraction efficiency, and curve 716 is the TE-top extraction efficiency. These results demonstrate that guided-mode light can be extracted preferentially through one major surface of the light guide by making the shape of the individual diffractive features (e.g. prisms) asymmetrical. The results also demonstrate that the degree to which light is preferentially extracted from one major surface depends on details of the particular shape of the diffractive features. In the case of right-angle prism features, preferential extraction can be maximized by selecting a height h approximately equal to the pitch p.

The diffractive surface features may be tailored so that light emitted from one major surface of the light guide (e.g. outcoupled light 217a in FIG. 2) is the same as, or similar to, the light emitted from the opposed major surface of the light guide (e.g. out-coupled light 217b in FIG. 2). The light emitted from the opposed surfaces may be the same with respect to color, intensity, and/or the angular distribution of color and/or intensity of the out-coupled light. In one approach, diffractive surface features may be provided on both opposed major surfaces, and these diffractive surface features may be mirror images of each other with respect to a reference plane disposed between and equidistant from the opposed major surfaces, such that the lighting device possesses mirror image symmetry with respect to such a reference plane. In alternative embodiments, the diffractive surface features may be tailored so that light emitted from one major surface of the light guide is substantially different from the light emitted from the opposed major surface of the light guide. The light emitted from the opposed surfaces may be different with respect to color, intensity, and/or the angular distribution of color and/or intensity of the out-coupled light. For example, an observer may perceive that light of one color is emitted from one major surface, and light of a substantially different color is emitted from the opposed major surface. In a horizontally-mounted lighting device, white light sources may be used with suitably tailored diffractive surface features such that white light of a relatively cool color temperature (bluish tint) is directed upwards towards the ceiling, and white light of a relatively warmer color temperature (reddish tint) is directed downwards towards the floor, or vice versa.

In applications where the angular separation of different colors of light due to diffraction is undesirable, several design approaches can be used to overcome the color separation issue. In one approach, shown in FIG. 8, two or more light guides can be stacked together. In another approach, shown in FIG. 9, different diffractive surface features are disposed on opposite major surfaces of a given light guide, and tailored for different colored light sources. In still another approach, shown in FIGS. 10 and 11, the diffractive surface features on a given major surface of a light guide may include groups of surface features of different pitches. Note that although these approaches are presented in connection with dealing with the color separation issue, they may also be used for other purposes including utilitarian and/or aesthetic purposes in which color separation still occurs, or in single-color embodiments that employ only light sources of a given desired (non-white) color. Note also that although the various approaches are described individually, any two or more of the approaches can be combined together and used in a single embodiment.

Figure 8:
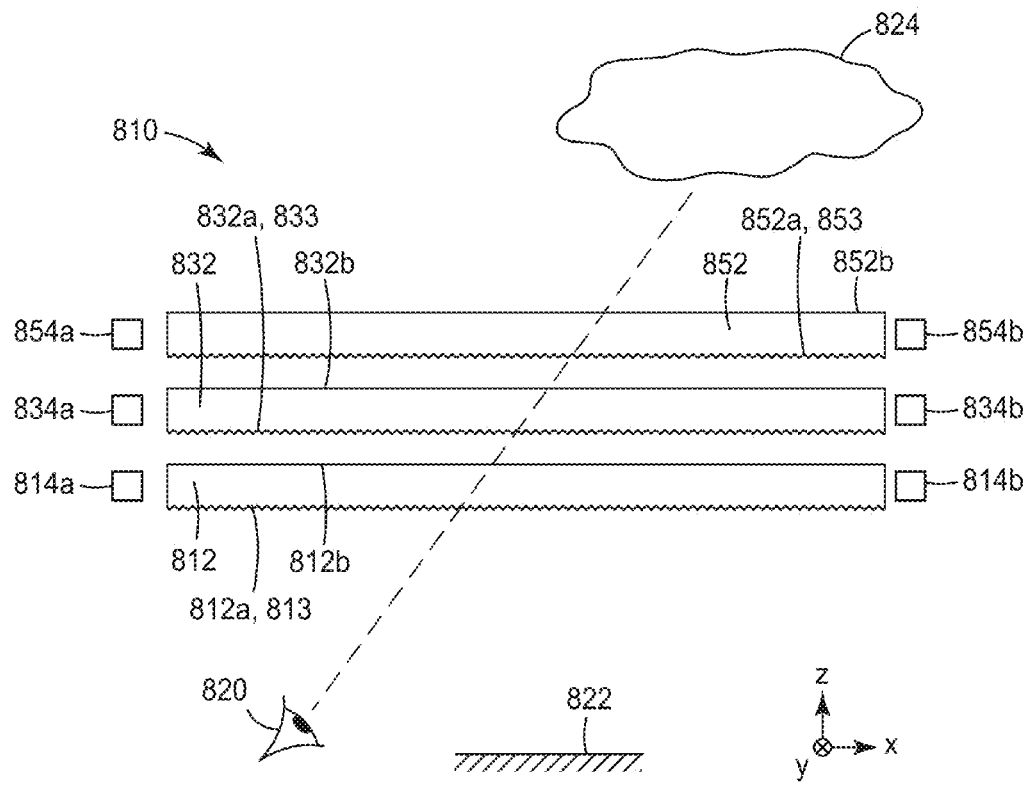
FIG. 8 is a schematic side or sectional view of a lighting device that includes a plurality of light guides in a stacked or layered arrangement.

Turning then to FIG. 8, we see there a schematic view of a lighting device 810 that includes a plurality of light guides 812, 832, 852 in a stacked or layered arrangement. Each light guide has a pair of opposed major surfaces, i.e., light guide 812 has major surfaces 812a, 812b, light guide 832 has major surfaces 832a, 832b, and light guide 852 has major surfaces 852a, 852b. At least one major surface of each light guide preferably includes diffractive surface features, for example, major surface 812a may include diffractive surface features 813, major surface 832a may include diffractive surface features 833, and major surface 852a may include diffractive surface features 853. The device 810 also includes light sources 814a, 814b, 834a, 834b, 854a, 854b arranged as shown to inject light into the respective light guides e.g. through their respective side surfaces, so as to provide guided-mode light in the light guides. Preferably, each of the light guides (including their diffractive surface features) has a low optical distortion such that non-guided-mode light can pass through the light guide relatively undisturbed. In this way, light extracted from the light guide 832 by the diffractive surface features 833 can pass through the light guide 812 to reach a user 820 and/or surface 822, and light extracted from the light guide 852 by the diffractive surface features 853 can pass through both light guide 812 and light guide 832 to reach the user 820 and/or surface 822. The surface 822 may be disposed to intersect the optical axis of the light guides, and may be perpendicular to such optical axis and disposed at a distance D from the light guides of at least 10 times a characteristic transverse dimension L (e.g. a diameter or length) of the light guides. The characteristic transverse dimension L may be a maximum in-plane dimension (caliper measurement) of the light guide. Alternatively, the minimum in-plane dimension (caliper measurement), or the average of the minimum and the maximum, may be used for the characteristic dimension L. Preferably, D is at least 2*L but no more than 50*L. Alternatively or in addition, D may be expressed in absolute units. Preferably, D is at least 0.2 meters but no more than 15 meters. The user 820 may also observe objects such as object 824, which may be the same as or similar to object 124 discussed above, through the stack of light guides 812, 832, 852 with little or no optical distortion.

If it is desirable to overcome the color separation issue, the various light guides, light sources, and diffractive surface features in the device 810 may be tailored to provide different colors of out-coupled light to the user 820 and/or surface 822 so that the sum of all such light provides substantially white light illumination. For example, the light sources 854a, 854b may emit red light and the diffractive surface features 853 may optimally extract such light along an optical axis (e.g. an axis parallel to the z-axis) of the device, and the light sources 834a, 834b may emit green light and the diffractive surface features 833 may optimally extract the green light along the same optical axis, and the light sources 814a, 814b may emit blue light and the diffractive surface features 813 may optimally extract the blue light along the same optical axis. Of course, red, green, and blue in the order described are merely examples, and the reader will understand that a multitude of alternative combinations are contemplated. Furthermore, although three light guides are shown in the stack of FIG. 8, other numbers of light guides, including two, four, or more, can also be used. The constituent components of each layer within the stack may all have the same or similar design, e.g., the same light guide dimensions and characteristics, the same dimensions and characteristics of the diffractive surface structures, and the same numbers, colors, and arrangements of LEDs. Alternatively, the constituent components of each layer may differ from corresponding components in other layers in any of these respects. Similar to lighting device 110, the device 810 may provide illumination of a substantially uniform color (which uniform color may be substantially white or a different, e.g. non-white, color) on the surface 822, while providing a colored appearance when the user 820 looks directly at the device 810. Also, the user may observe spatial pattern(s) such as indicia in the emitting area of the device 810, which pattern(s) or indicia may originate with any one, or some, or all of the layers within the stack, and/or one or more bands having a 3-dimensional appearance in the emitting area of the device 810, which bands may originate with any one, or some, or all of the layers within the stack.

Figure 9:
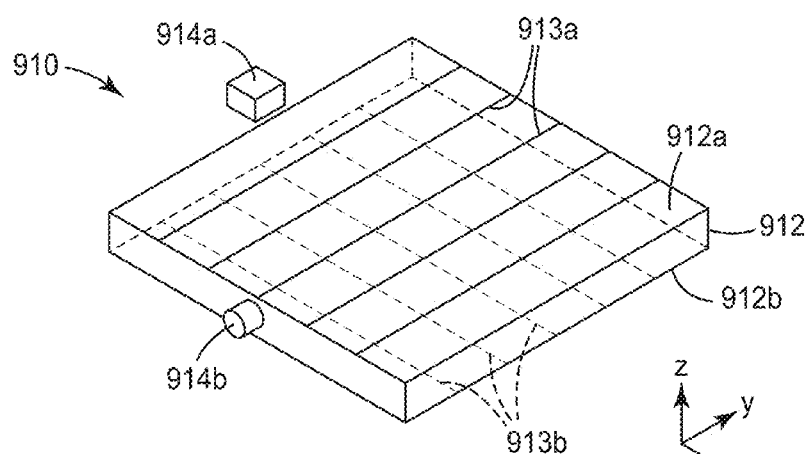
FIG. 9 is a schematic perspective view of a lighting device that includes different diffractive surface features disposed on opposite major surfaces of the light guide and tailored for different colored light sources.

Turning to FIG. 9, we see there a schematic view of a lighting device 910 that includes a light guide 912, and light sources 914a, 914b disposed to inject light into different (e.g. orthogonal) side surfaces of the light guide. The light guide 912 has a pair of opposed major surfaces 912a, 912b. In device 910, each major surface has its own diffractive surface features: surface 912a has diffractive surface features 913a, and surface 912b has diffractive surface features 913b. The diffractive surface features are represented only schematically in the figure, but indicate that features 913a extend generally parallel to one in-plane axis (e.g. the y-axis), and the features 913b extend generally parallel to an orthogonal in-plane axis (e.g. the x-axis). The light sources are likewise positioned and configured to inject light generally along orthogonal in-plane directions, with source 914a disposed to inject light generally along the x-axis and source 914b disposed to inject light generally along the y-axis. The term "generally" is used here because the light sources need not be (and in many cases are not) collimated, but emit light in a distribution of angles in the x-y plane. Also, although the sources 914a, 914b are each shown as a discrete point source such as a single LED emitter, they may alternatively each be a linear array of such discrete sources extending along the respective side surface of the light guide, or a linear or bar-shaped extended source. Nevertheless, light from the source 914a propagates predominantly along the in-plane x-axis, such that it interacts strongly with the diffractive surface features 913a and weakly with the diffractive surface features 913b, and light from the source 914b propagates predominantly along the in-plane y-axis, such that it interacts weakly with the features 913a and strongly with the features 913b.

This selective coupling of the light sources to different respective diffractive surface features on the light guide using geometry or directionality can, if desired, be used to address the color separation issue. For example, the light sources may be substantially complementary in their emission spectra, e.g., source 914a may emit blue light and source 914b may emit yellow light, in which case the diffractive surface features 913a may be configured to extract blue light along a given direction such as an optical axis (e.g. the positive z-axis) of the lighting device 910, while the diffractive surface features 913b may be configured to extract yellow light along the same direction, so as to provide substantially white light illumination along the optical axis. There is little interaction between the blue or yellow light with the diffractive surface features (light extraction grating) of the opposite color because, as explained above, the grooves for blue light extraction extend generally along the light path of the yellow light, the grooves for yellow light extraction extend generally along the light path of the blue light. The different colored light beams are thus guided and extracted independently in the same light guide. The combined visual effect of the out-coupled blue and yellow light gives rise to a sensation of white light to an observer or user. The color rendering index (CRI) of the white light in this example may however be relatively low, because the light guide 912 combines only two colors.

The approach shown in FIG. 9 can be extended to numerous other embodiments, including embodiments that use light sources of other colors, including combinations of different complementary colors, and colors that are not complementary, including also colors that may be the same (e.g. green-emitting light for both sources 914a and 914b, or red-emitting light for both sources). Also, a lighting device such as device 910 can be combined with other lighting devices of similar or different design, e.g. in a stacked arrangement as described in connection with FIG. 8. In such a case, each light guide may be configured to emit a combination of two distinct colors, and the colors collectively emitted from the stack may be selected to produce white light with a higher CRI, if desired.

Another approach that may be used to address the color separation issue is the approach shown generally in FIGS. 10 and 11. In these figures, light guides 1012, 1112 are shown in which the diffractive surface features on a given major surface include groups or packets of surface features of different pitches. The multiple different pitches can be used generally to provide a desired distribution of various wavelengths of extracted light from the light guide, assuming light of such wavelengths is injected into the light guide by one or more light sources (not shown).

As mentioned elsewhere, the light guides disclosed herein may have a variety of different constructions, including a unitary construction, or a layered construction in which two or more components are attached to each other with no significant intervening air gaps. In this regard, the light guides 1012, 1112 are shown to have layered constructions, but they may be readily modified to have a unitary construction if desired. Conversely, light guides shown as being unitary in other figures may be readily modified to have layered constructions. In reference to FIG. 10, the light guide 1012 includes a relatively thick plate or other substrate 1011a, to which is attached a film made up of a carrier film 1011b on which a prism layer 1011c has been cast and cured. The substrate 1011a, carrier film 1011b, and prism layer 1011c preferably have the same or similar index of refraction, and are preferably all highly transmissive to visible light, with little or no scattering or absorption, although in some cases a controlled amount of absorption and/or scattering may be acceptable or even desirable. In reference to FIG. 11, the light guide 1112 may have a similar construction to light guide 1012, and thus may include a relatively thick plate or other substrate 1111a, to which is attached a film made up of a carrier film 1111b on which a prism layer 1111c has been cast and cured.

Attachment of a prismatic or structured surface film to a plate or other substrate to provide a layered light guide can be done by any suitable technique. For example, attachment can be achieved using a suitable adhesive, such as a light-transmissive pressure sensitive adhesive. Attachment may also be achieved using injection molding processes, including insert injection molding processes. Chemical bonds can also be used for attachment, e.g., when a curable resin is cast and cured on a suitable substrate such as a carrier film. Alternatively, in the case of unitary constructions, the diffractive surface features can be formed on at least one surface of a unitary substrate such as a film or plate, e.g. by embossing or molding, including for example injection molding processes. Compression molding, extrusion replication, and direct cutting are additional techniques that may be used to form the diffractive surface features. Regardless of whether the diffractive structures are formed on the surface of a film, plate, or other substrate, the diffractive surface features may be fabricated using any suitable technique now known or later developed. Additional methods that can be used to make suitable diffractive surface features are discussed in one or more of: WO 2011/088161 (Wolk et al.); US 2012/0098421 (Thompson); and US 2012/0099323 (Thompson).

The light guides 1012, 1112 have respective first major surfaces 1012a, 1112a, and respective second major surfaces 1012b, 1112b opposite the first surfaces, as well as side surfaces (not shown). Similar to other light guides described herein, the first major surfaces 1012a, 1112a are configured to have diffractive surface features 1013, 1113, respectively. The surface features may be referred to as grooves or prisms. The grooves/prisms are shown as having an asymmetric 90 degree sawtooth profile in cross section, but other profiles can also be used as desired including other asymmetric profiles and symmetric (e.g. V-shaped) profiles. In plan view the grooves/prisms may follow paths that are straight, curved, or both (e.g. straight in some places and curved in other places). Significantly, the diffractive surface features 1013, 1113 are arranged into groups or packets, the prisms or grooves in any given packet having a uniform pitch but adjacent packets having different pitches. In some cases, the packets can be arranged in patterns that repeat across the surface of the light guide, the smallest repeating group of packets being referred to here as a "set" of packets. For example, light guide 1012 (FIG. 10) has diffractive surface features 1013 which are divided into groove or prism packets 1030, 1031, and 1032, these packets being arranged in a repeating sequence which defines sets 1040. The prisms or grooves in each of packets 1030, 1031, 1032 have a uniform pitch, but the pitch in packet 1030 is less than that in packet 1031, which in turn is less than that in packet 1032. Light guide 1112 (FIG. 11) has diffractive surface features 1113 which is divided into groove or prism packets 1130, 1131, 1132, 1133, 1134, and 1135. These packets may also be arranged in a repeating sequence to define set 1140. The prisms or grooves in each of packets 1130, 1131, 1132, 1133, 1134, and 1135 have a uniform pitch, but the pitch gets progressively larger as one moves from packet 1130 to packet 1135. Note that although different pitches are used in the various packets shown in FIGS. 10 and 11, preferably every one of the pitches is in a range suitable for coupling some visible guided-mode light out of the light guide by principles of diffraction.

The width (in-plane transverse dimension) of the packets and the width of the sets of packets, when the light guide is seen in plan view, may be small enough so that they are visually imperceptible to the ordinary observer. Alternatively, the width of the packets and/or the widths of the sets of packets may be large enough so that they are perceptible as indicia or as an aesthetic pattern to the ordinary observer.

Multiple pitch extraction designs such as those depicted in FIGS. 10 and 11 can be used for color mixing. Generally speaking, at least two different packets, characterized by two different pitches, can be used, but in many cases at least three different packets, characterized by three different pitches p1, p2, p3, are desirable. The choice of the pitch dimension is a function of the refractive index (n) of the light guide, as well as a function of the wavelength of light ($\lambda$) we wish to extract from the light guide with the given packet. In an exemplary case we may select $p1=\lambda 1/n$, where $\lambda 1$ is in a range from 400 to 600 nm, and $p2=\lambda 2/n$, where $\lambda 2$ is in a range from 500 to 700 nm, and $p3=\lambda 3/n$, where $\lambda 3$ is in a range from 600 to 900 nm. In the case of light guides made of acrylic ($n \approx 1.49$) or similar materials, these conditions correspond to a pitch p1 in a range from about 268 to 403 nm, p2 in a range from about 336 to 370 nm, and p3 in a range from 403 to 604 nm. Polychromatic light such as white light propagating within the light guide interacts with the multiple pitch packets so that light of different colors is diffracted (out-coupled or extracted from the waveguide) at different angles for each given packet, the extraction angle for any given color also being different for the different packets. As a result, light of the various colors can be mixed or combined to provide illumination with substantial color uniformity, e.g. substantially white light, for users or objects disposed at a suitable distance from the light guide.

In exemplary embodiments, the lighting device may utilize a plurality of light sources having different spectral outputs, and a controller can be used to independently control the different light sources to actively or dynamically control the perceived color of the light emitted by the lighting device. This active control can be used to adjust or otherwise change the color temperature, correlated color temperature, and/or the color rendering index (CRI) of the output light. Assemblies or combinations of red, green, and blue-emitting LEDs (RGB), or red, green, blue, and white-emitting LEDs (RGBW), are of particular benefit for this purpose. Also, light guides that incorporate a multiple pitch extraction design are also of particular benefit. Preferably, the multiple pitch design incorporates at least one packet of diffractive features of a given pitch for each narrow-band emitting light source, e.g., one or more packets whose pitch is tailored for red light, one or more packets whose pitch is tailored for green light, one or more packets whose pitch is tailored for blue light, and so forth. Note that individual narrow band colors are not limited to red, green, and blue, and light sources that emit other non-white colors such as yellow or amber may also be used to expand the color gamut of the disclosed lighting devices.

A design parameter of interest for the multi-pitch grating design, as well as for other disclosed diffractive surface feature designs, is the effective extraction efficiency. Extraction efficiency was discussed above and will not be repeated here. The "effective" extraction efficiency refers to the percentage of specified light extracted from the specified major surface (612a or 612b) upon a single interaction, divided by the amount of such specified light propagating within the light guide immediately before the interaction with the extraction surface. The effective extraction efficiency for diffractive surface features (grooves or prisms) of a given pitch can be evaluated and compared to the effective extraction efficiencies of other pitches. In general with given system parameters, the effective extraction efficiency of a given pitch: is a linear function of (i.e., directly proportional to) the plan-view area coverage of diffractive features having that pitch (e.g., for the smallest pitch in FIG. 10, the sum of the plan-view areas of the three packets 1030 on the surface); and also depends on other factors including the pitch of the diffractive features and the cross-sectional profile shape of the diffractive features (grooves/prisms). In order to obtain substantial color uniformity, it is desirable to ensure that the effective extraction efficiencies for the different pitches are comparable to each other, e.g., the ratio of effective extraction efficiencies for any two distinct pitches preferably lies within the range from about 0.3 to 3.

Figure 5A:
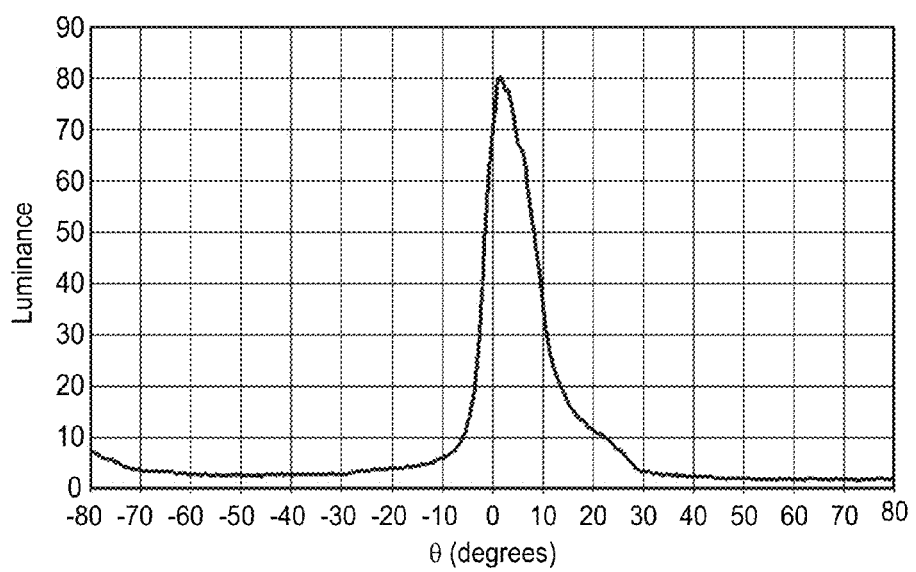
FIG. 5a is a graph of measured luminance versus polar angle along a particular observation plane for the conoscopic plot of FIG. 5.

As we saw in connection with FIGS. 4, 5, and 5a, a monochromatic Lambertian light source used to inject light into a light guide having a single pitch linear diffraction grating gives rise to a crescent-shaped distribution of out-coupled light characterized by a relatively narrow light extraction angle. If even further angular narrowing of the out-coupled light is desired, the light source can be reconfigured with suitable lenses, mirrors, or other components to emit light that is collimated or nearly collimated rather than Lambertian. Conversely, if angular widening of the out-coupled light is desired, the light source can be reconfigured to emit light over a broader angular range than a Lambertian distribution. Microstructured optical films can be combined with light sources such as LEDs or lasers to tailor the angular spread of light injected into the light guide, thereby also affecting the angular spread of the out-coupled light. Suitable microstructured optical films are described in PCT Patent Publications WO 2012/075352 (Thompson et al.) and WO 2012/075384 (Thompson et al.). These optical films, which may be referred to as uniformity tapes, can be applied directly to the edge or side surface of a light guide and comprise refractive structures facing outward toward the light source to enhance coupling of light into the light guide. The refractive structures may alternatively be incorporated directly into the side surface or injection edge of the light guide, e.g. by injection molding, embossing, or direct machining Such optical films or refractive structures, when disposed between an LED source and the side surface of a light guide, can broaden the angular spread of light injected into the light guide, and can be used with one, some, or all of the light sources in any of the embodiments disclosed herein. Optical films with custom designed replicated structures can also be used with coherent lasers to provide a well-defined rectangular-shaped angular distribution of light (i.e., a light distribution of approximately constant intensity over a specified cone of angles, and zero or near zero intensity outside the specified cone) for injection into the light guide.

The angular spread of the out-coupled light can also be tailored by appropriate selection of the physical width (in-plane transverse dimension) of the packets of diffractive features, where the physical width is measured orthogonally to the direction of elongation of the prisms/grooves. The physical width of each packet affects all colors of light interacting with the packet, and the overall extracted light is an average effect of all the packets. Physical widths that are small tend to broaden the angular width of the out-coupled light, while physical widths that are large tend to narrow the out-coupled light angular width. However, the amount of angular broadening or narrowing that can be achieved by physical width adjustment is somewhat limited because physical widths that are too small can lead to excessive light spreading such that the diffractive surface features produce a high degree of distortion or scattering, and such that the light guide appears to be diffusive rather than diffractive.

Another technique for producing illumination that is more angularly dispersed (for better spatial uniformity at remote surfaces) is to use a pattern of diffractive surface features oriented along different in-plane directions, e.g., corresponding to different azimuthal angles in the conoscopic plot of FIG. 5. The differently oriented diffractive features are preferably also combined with corresponding light sources that emit light generally along different in-plane directions tailored for maximum extraction efficiency with the corresponding diffractive features. The combination of the variously oriented diffractive features and the variously oriented light sources can produce out-coupled light emitted at a variety of azimuthal directions, resulting in illumination that is more angularly dispersed and more spatially uniform. In an exemplary embodiment, at least three distinct diffractive feature orientations can be used, corresponding to in-plane axes separated from each other by azimuthal angles of 120 degrees.

Differently oriented diffractive features can also be achieved through the use of continuously curved grooves or prisms, e.g., grooves or prisms that are circular, oval, or elliptical in shape (in plan view), or portions of such shapes, e.g., arcs, including series of interconnected arcs such as in sinusoidal or otherwise undulating shapes. In that regard, embodiments disclosed herein that are described as having linear diffractive surface features can alternatively employ diffractive features that are curved. Linear or curved diffractive surface features, when combined with discrete light sources and/or non-uniform reflective structures, can be used to produce visual features in the form of bright or dark bands. Bands such as these are highly undesirable in most extended source applications, but in some cases can be exploited to provide the lighting device with an aesthetic 3-dimensional appearance.

Figure 12:
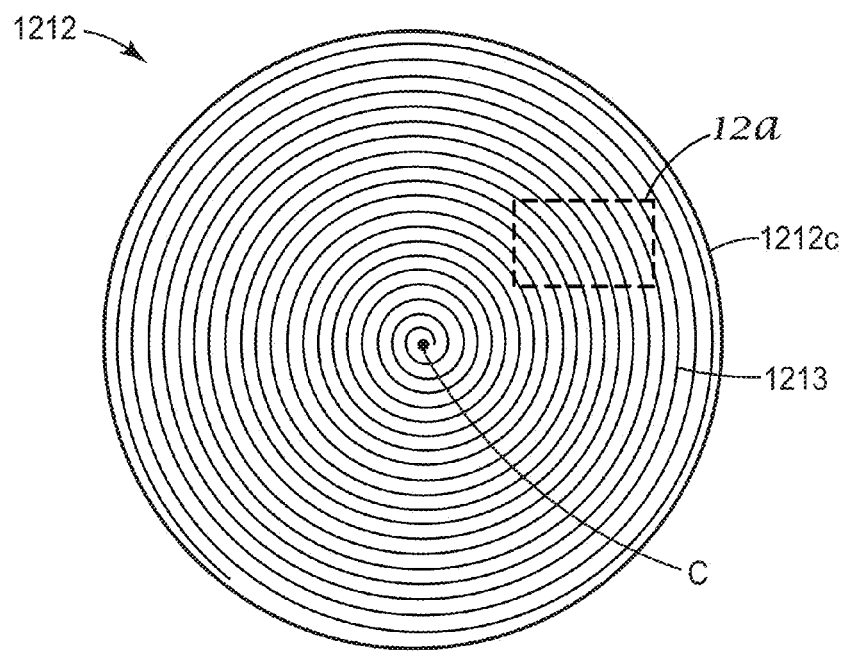
FIG. 12 is a schematic front or plan view of a light guide having diffractive surface structures formed into a spiral.
Figure 12A:
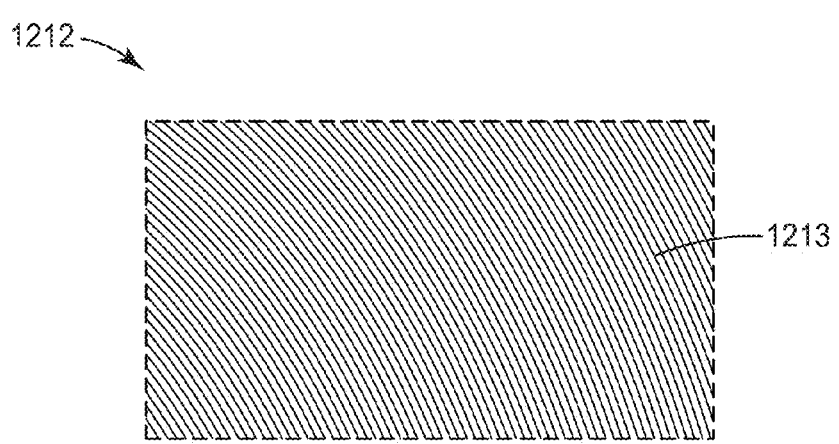
FIG. 12a is a detail of the light guide of FIG. 12.

FIG. 12 shows an exemplary light guide 1212 that can be used as a component in the lighting devices disclosed herein. The light guide 1212 has opposed major surfaces and a side surface 1212c extending continuously around the periphery of the light guide in the form of a narrow circular ring. Diffractive surface features 1213 are provided on one of the major surfaces. In this embodiment, the diffractive features 1213 form a tightly wound spiral, substantially filling one major surface of the light guide. The diffractive features 1213 are thus all curved in plan view over substantially their entire lengths, and the curvature changes monotonically as a function of radial distance from the geometrical center of the light guide 1212 and of the diffractive features 1213, which center is labeled "C" in FIG. 12. A portion of the light guide 1212 and of the diffractive surface features 1213 is shown in a schematic magnified view in FIG. 12a. The pitch of the diffractive features (radial distance between adjacent grooves or prisms) can be uniform or non-uniform, as discussed elsewhere herein. In alternative embodiments, the tightly wound spiral can be replaced with concentric circles or other similar shapes. In other alternative embodiments, the circular shape of the light guide 1212 and the substantially circular shape of the diffractive surface features 1213 can be changed to other curved shapes, such as ellipses or ovals. Furthermore, diffractive surface features may alternatively be provided on both major surfaces of the light guide 1212, or on only a portion of one, or both, major surfaces.

Figure 13:
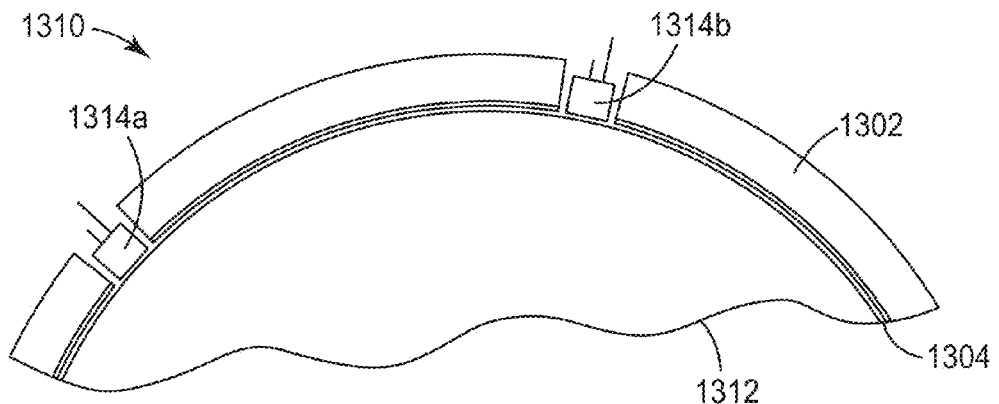
FIG. 13 is a schematic front, plan, or sectional view of a portion of a lighting device including a light guide, discrete light sources disposed to inject light into the light guide, and support structure.

Turning now to FIG. 13, shown there is an exemplary arrangement of how discrete light sources can be mounted along a curved side surface of a light guide. A lighting device 1310 includes a light guide 1312, discrete light sources 1314a, 1314b disposed to inject light into a curved side surface of the light guide 1312, and support structure 1302 such as a mounting ring. Diffractive surface features, not shown here but described elsewhere herein, are provided on a major surface of the light guide 1312 to extract guided-mode light out of the light guide. The light sources 1314a, 1314b may be or comprise LEDs or similar small area light sources. The light sources are mounted in apertures or slots of the support structure 1302. If desired, the support structure 1302 can be made of a metal or other reflective material to provide an extended reflector along the side surface of the light guide 1312. Alternatively, a thin reflective film 1304 may be interposed between the support structure and the side surface. In other embodiments, the support structure 1302 can be made of an absorbing (or other low reflectivity) material, and/or the film 1304 can be made to be absorbing or of low reflectivity. The light sources need not be mounted at the side surface of the light guide in order to provide guided-mode light. For example, the light sources may inject light through an outer (e.g. annular) portion of the major surface of the light guide rather than through the side surface, and the side surface may in that case be beveled or angled (e.g. at 45 degrees) so that light from the light source that enters through the major surface is reflected sideways to provide guided-mode light.

Figure 14:
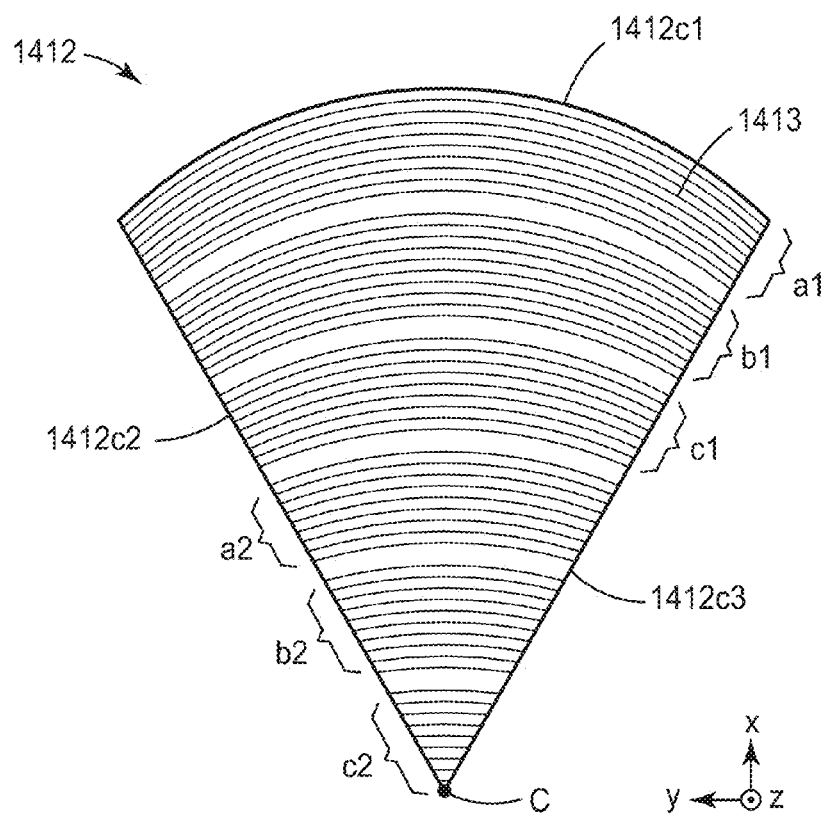
FIG. 14 is a schematic front or plan view of a flat pie-shaped light guide having diffractive surface structures of equal curvature.

FIG. 14 depicts another light guide 1412 that may be used in the disclosed light sources. The light guide 1412 is assumed to be flat, lying in an x-y plane, with opposed major surfaces that are sector-shaped or pie-piece-shaped. Bounding the major surfaces are side surfaces 1412c1, 1412c2, 1412c3. The side surface 1412c1 is curved, e.g. like an arc of a circle, and the side surfaces 1412c2 and 1412c3 are flat. The side surfaces 1412c2, 1412c3 intersect at a center point C, which may be a center of curvature of the curved side surface 1412c1. Diffractive surface features 1413 are provided on one or both major surfaces of the light guide 1412. Rather than being concentric, the diffractive features 1413 are assumed to all have the same curvature, which may be equal to the curvature of the curved side surface 1412c1. Furthermore, the diffractive surface features 1413 are arranged into packets of different pitches. These include: packets a1 and a2, having a pitch configured to extract red guided-mode light at a predetermined angle (e.g. orthogonal to the surface of the light guide); packets b1 and b2, having a pitch configured to extract green guided-mode light at the same or different predetermined angle; and packets c1 and c2, having a pitch configured to extract blue guided-mode light at the same or different predetermined angle. The packets are thus arranged into two sets of packets.

In an exemplary embodiment, the packets a1, a2 occupy a first total area of the light guide, the packets b1, b2 occupy a second total area of the light guide, and the packets c1, c2 occupy a third total area of the light guide, and the first, second, and third total areas have relative proportions are related to a spectral intensity distribution of the one or more light sources. For example, the first total area may be greater than the second total area, which may in turn be greater than the third total area, such that the combination of all red, green, and blue light extracted from the light guide 1412 in a particular direction, e.g. along an optical axis (see the z-axis in FIG. 14) provides substantially white light illumination at a reference surface of interest that is remote from the light guide 1412. The maximum transverse dimension of the light guide 1412 is the radial distance from the center point C to the side surface 1412c1. The reference surface of interest may be perpendicular to the optical axis, and separated from the light guide 1412 by a distance D of intermediate length along the optical axis. The distance D may be expressed in terms of a characteristic transverse dimension L of the first major surface of the light guide, such as the radial distance from the point C to the surface 1412C1. Alternatively, the minimum in-plane dimension (caliper measurement) or the average of the minimum and the maximum may be used for the characteristic dimension L. Preferably, D is at least 2*L but no more than 50*L. Alternatively or in addition, D may be expressed in absolute units. Preferably, D is at least 0.2 meters but no more than 15 meters.

The reader will appreciate that numerous modifications can be made to the light guide 1412 in accordance with the other teachings herein. For example, other pitch configurations can be used for the diffractive surface features, including constant pitch over the entire light guide, and other numbers of packet types and/or other numbers of packet sets. Also, the diffractive surface features 1413 may all be made to be concentric, e.g. with a center of curvature at the center point C, rather than a constant curvature.

Figure 15:
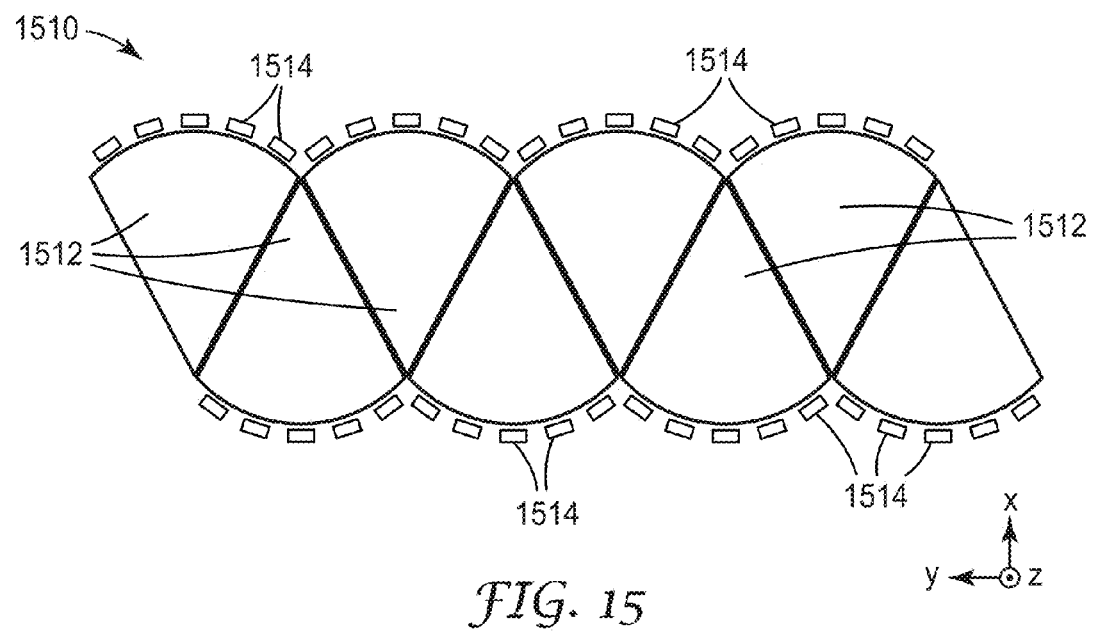
FIG. 15 is a schematic front or plan view of a lighting device that includes a group of flat pie-shaped light guides and discrete light sources.

Light guides such as that of FIG. 14 are suitable for being combined together with light guides of the same or similar design to provide a lighting device with an even larger extended emitting area. Such a lighting device is shown in FIG. 15 as lighting device 1510. The device 1510 includes sector- or pie-shaped light guides 1512 that may be affixed to each other in an alternating tiling arrangement as shown so the resulting group of light guides extends along the y-direction. In this arrangement, straight side surfaces (see e.g. surfaces 1412c2, 1412c3 in FIG. 14) of adjacent light guides 1512 are affixed to each other. The various light guides 1512 may all have the same nominal design features, e.g. the same pitch configuration of diffractive surface features, or light guides of differing design may instead be used. One, some, or all of the light guides 1512 may be the same as or similar to light guide 1412 of FIG. 14.

The device 1510 also includes a plurality of discrete light sources 1514 distributed along the curved side surfaces of the light guides 1512 to inject light therein. Preferably, one, some, or all of the light sources 1514 interact with diffractive surface features on their respective light guides to produce bands whose shapes changes as a function of viewing angle. The light sources 1514 may all be of the nominally same design, e.g., nominally the same output spectrum (color), output power, and physical dimensions. For example, the light sources 1514 may all emit substantially white light. Alternatively, two or more of multiple light sources may substantially differ in design, e.g., they may have different output spectra (e.g. one may emit red light, another may emit green light, another may emit blue light, another may emit white light, and so forth), or different output powers. If three distinct packet types of diffractive surface features are used for each light guide 1512, e.g. a red, green, and blue packet type as shown in FIG. 14, then the light sources 1514 for each light guide 1512 may comprise or consist essentially of one or more red light source, one or more green light source, and one or more blue light source.

Figure 16A:
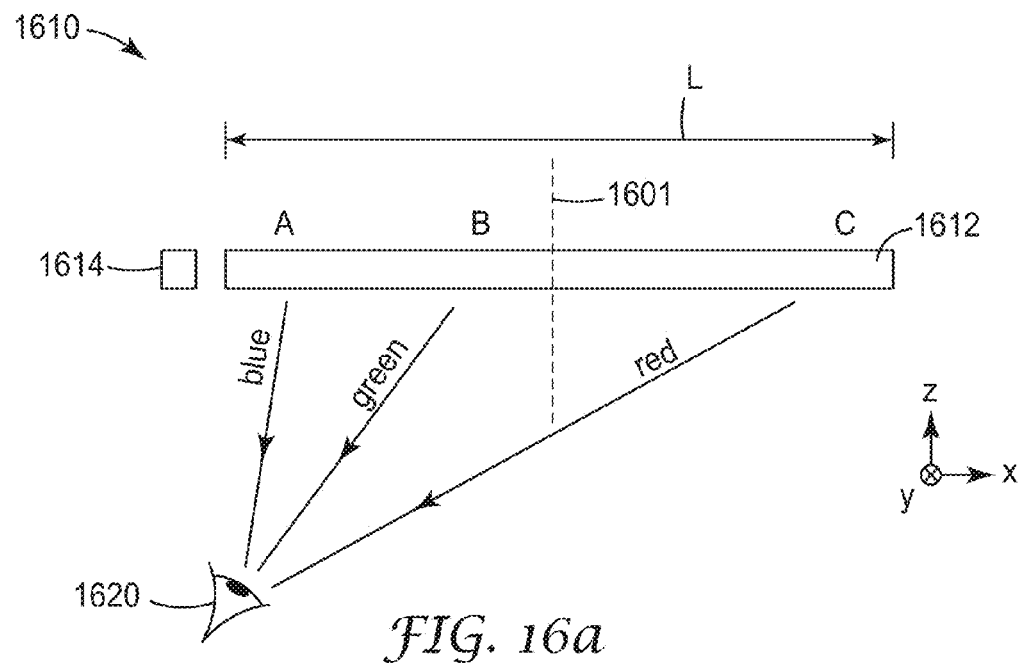
FIGS. 16a and 16b are schematic side or sectional views of a lighting device that has a colorful appearance when observed by an ordinary user, but that provides substantially white light illumination at a remote reference surface of interest.
Figure 16B:
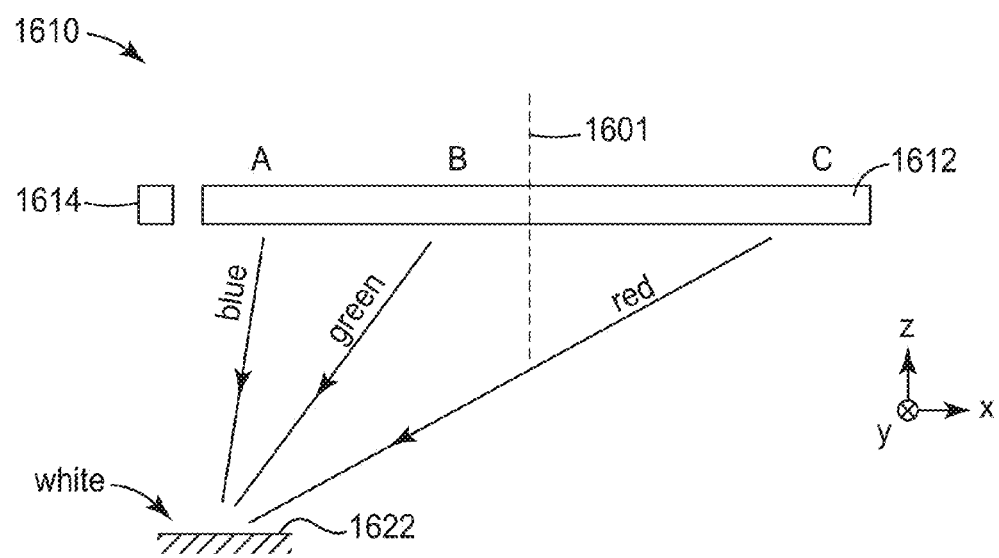

FIGS. 16a and 16b are schematic views of a lighting device 1610 that has a substantially colorful appearance when observed by an ordinary user 1620, but that provides illumination of a substantially uniform color, and which may be substantially white, at a remote reference surface of interest 1622. The device 1610 includes a light guide 1612 having a symmetry or optical axis 1601, which in this case is parallel to the z-axis because the light guide 1612 extends parallel to the x-y plane. The light guide has a characteristic transverse (in-plane) dimension L. The light guide 1612 may be the same as or similar to other light guides discussed herein. One or more light sources, represented by light source 1614, are disposed to inject light into the light guide 1612. The light source 1614 preferably emits light throughout the visible wavelength spectrum, at least, for example, in the red, green, and blue regions of the spectrum. This light enters the light guide and propagates within and along the light guide as guided-mode light.

A plurality of diffractive surface features, which are not shown in FIG. 16a but are as described elsewhere herein, are provided on at least one major surface of the light guide 1612. The diffractive surface features couple the guided-mode light out of the light guide 1612 by the mechanism of diffraction, such that light of different wavelengths is extracted or outcoupled from the light guide at different angles at any given point on the major surface of the light guide. Due to the diffractive effect, an ordinary user 1620 of the device, such as an occupant of a room illuminated by the device 1610, observes substantially different colors in different regions of the light guide. For example, as shown in the figure, the user 1620 may perceive light of a blue color at a position or region A of the light guide, light of a green color at a position or region B of the light guide, and light of a red color at a position or region C of the light guide. In general, the perceived colors and their spatial distribution across the output of the light guide change as a function of viewing direction and viewing position. The user may observe such colors over a wide range of viewing directions and at a variety of observation positions, including both positions that are relatively close to and positions that are remote from the light guide 1612. The observation positions may, for example, be separated from the light guide 1612 by up to about 50 times the dimension L, or as little as 2 times L. The observation positions may also or alternatively be separated from the light guide by up to 15 meters or as little as 0.2 meters. However, at at least one viewing geometry, the user observes substantially different colors in different regions of the light guide. Colors that are "substantially different" may be quantified in terms of the CIE chromaticity diagram, as discussed elsewhere herein.

The diffractive surface features are tailored, in combination with other elements of the lighting device 1610 such as the output spectrum of the light source 1614, so that the light guide 1612 illuminates a reference surface of interest disposed remotely from the light guide with light that is substantially spatially uniform in color, and that in exemplary embodiments is also substantially white. In FIG. 16b, such a reference surface of interest 1622 is shown to replace the user

1620 at the same remote observation or illumination position. This position is shown to be offset from the optical axis 1601, but it may alternatively be in alignment with (lie on) the optical axis. The substantially uniform color illumination may defined over a measurement portion of the surface 1622, the measurement portion defined by the illuminance of the light on the surface 1622 being above a given threshold value, e.g., equal to or greater than the maximum illuminance ("Imax") on the surface 1622 divided by the mathematical constant "e". Within this measurement portion, colors may be said to be "substantially uniform" by reference to the CIE chromaticity diagram, as discussed elsewhere herein. Such uniform color illumination may be maintained over the entire measurement portion of the reference surface 1622.

To achieve results such as these, the diffractive surface features include diffractive surface features of different pitches. For example, one or more first packets of first diffractive surface features having a first pitch, one or more second packets of second diffractive surface features having a second pitch different from the first pitch, and one or more third packets of third diffractive surface features having a third pitch different from the first and second pitches, may be included. The first, second, and third pitches may be tailored to extract blue light, green light, and red light respectively along a desired observation direction, e.g., parallel to the optical axis 1601. The first, second, and third packets may be arranged in repeating groups or sets on the major surface of the light guide 1612. The first packets may occupy a first total area of the light guide, the second packets may occupy a second total area of the light guide, and the third packets may occupy a third total area of the light guide, and relative proportions of the first, second, and third total areas may be related to a spectral intensity distribution of the light source 1614 used for light injection. The first, second, and third diffractive surface features may include surface features that, in plan view, extend along a plurality of in-plane directions. For example, such surface features may be substantially circular or at least curved in shape, in plan view.

Figure 17:
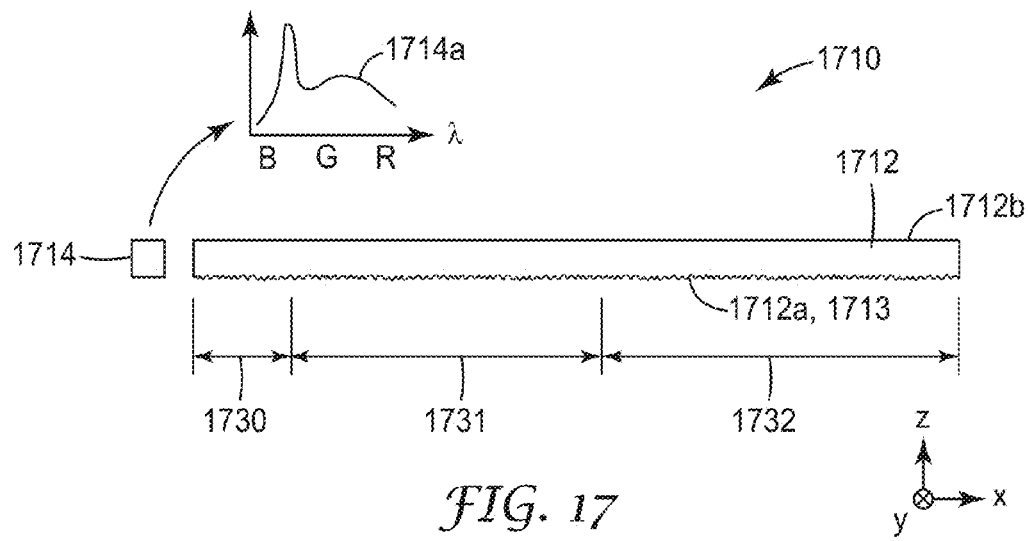
FIG. 17 is a schematic side or sectional view of a lighting device in which relative widths or areas of three different types of diffractive surface features are selected in accordance with a light source whose spectral intensity distribution has a high blue content.
Figure 18:
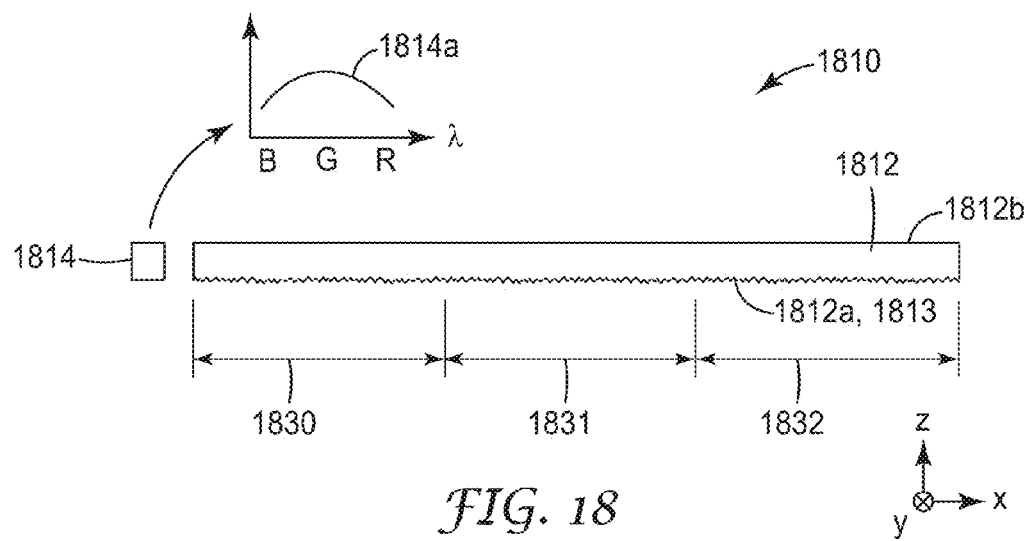
FIG. 18 is a schematic side or sectional view of a lighting device similar to that of FIG. 17, but where a light source is used whose spectral intensity distribution does not have the unusually high blue content, and the relative widths or areas of the three different types of diffractive surface features are adjusted accordingly.

FIGS. 17 and 18 schematically illustrate the concept of tailoring the total areas of different types of diffractive surface features such that their relative values are related to the spectral intensity distribution of the light source(s) that injects light into the light guide. In FIG. 17, a lighting device 1710 includes a light guide 1712 and one or more light sources disposed to inject light into the light guide, all of these light sources represented schematically by a single light source 1714. The light guide 1712 has a first major surface 1712*a* and an opposed second major surface 1712*b*, and at least one of the major surfaces is provided with diffractive surface features 1713. The diffractive surface features 1713 are made up of three different types of diffractive surface features, the three types differing in groove or prism pitch. First diffractive surface features lie in a region 1730, and are assumed to have a first pitch and other design characteristics tailored to extract blue light from the light guide 1712 along a particular direction, e.g. parallel to an optical axis of the light guide. In FIG. 17, the optical axis of the light guide 1712 is parallel to the z-axis. Second and third diffractive surface features lie in regions 1731 and 1732, respectively, and are assumed to have respective second and third pitches tailored to extract green and red light from the light guide 1712 along the same particular direction. The regions 1730, 1731, 1732 are assumed to occupy first, second, and third total areas respectively of the surface 1712*a* in plan view, the total areas being in proportion to the lengths (or widths) of the regions shown in the figure. For simplicity, FIG. 17 shows each of the first, second, and third diffractive surface features grouped into a single packet of diffractive surface features, the different packets bordering each other but not overlapping. In alternative embodiments, each of the various types of diffractive surface features can be divided into numerous packets of uniform or non-uniform width as desired while preserving the total areas occupied by the respective types of diffractive features, and the packets for the different types of diffractive features can be interspersed on the major surface e.g. in a cyclic, repeating, non-overlapping fashion.

The light source 1714 is assumed to emit light over enough of the visible spectrum so that its overall output is substantially white (although in some cases the overall output may not be substantially white but nevertheless broadband in character, so that the user can observe substantially different colors at different regions of the light guide), but the spectral content need not be uniform or smoothly varying as a function of wavelength. In fact, we assume that source 1714 emits light in a substantially non-uniform fashion over the visible spectrum, as indicated schematically by the spectral intensity distribution 1714*a*. The distribution 1714*a* is assumed to have a spike or excess of light output in the blue region of the spectrum relative to the green and red regions. Such a spike may occur with some LED products that use a blue LED die to excite a yellow phosphor. Whatever the cause, the regions 1730, 1731, 1732 are tailored to compensate for the blue spike by having the first total area substantially less than the second or third total areas. The smaller total area for region 1730 results in less blue light being extracted along the particular direction (such as the optical axis) compared to green or red light. In this way, the extracted light emitted along the particular direction does not exhibit the same blue spike that is present in the light emitted by the light source 1714 and in the guided-mode light. This allows the lighting device 1710 to illuminate the reference surface of interest disposed remotely from the light guide with light that is substantially uniform in color. The substantially uniform color may be maintained over a measurement portion of the reference surface defined by the illuminance of the light being above a given threshold value, e.g., Imax/e.

FIG. 18 is provided as a contrast to FIG. 17. In FIG. 18, a lighting device 1810 includes a light guide 1812 with major surfaces 1812*a*, 1812*b*, diffractive surface features 1813, and light source 1814 disposed to inject light into the light guide. The diffractive surface features 1813 are made up of three different types of diffractive surface features of differing pitches: first diffractive surface features in a region 1830, second diffractive surface features in a region 1831, and third diffractive surface features in a region 1832. These various components of lighting device 1810 may be substantially the same as corresponding components of lighting device 1710 (e.g., the first, second, and third diffractive surface features have different first, second, and third pitches designed to extract blue, green, and red light respectively along the same particular direction such as the optical axis), except that the spectral intensity distribution 1814*a* of the light source 1814 is more evenly distributed with regard to the red, green, and blue regions of the visible spectrum than the distribution 1714*a*. This difference in spectral output of the light source is compensated for by readjustment of the first, second, and third total areas. As a result, the first total area is no longer substantially less than the second or third total areas. In lighting device 1810, the first, second, and third total areas are more nearly equal to each other. In this way, the lighting device 1810 is able to illuminate a reference surface of interest disposed remotely from the light guide with substantially white and uniform light, similar to the illumination provided by lighting device 1710.

Figure 18A:
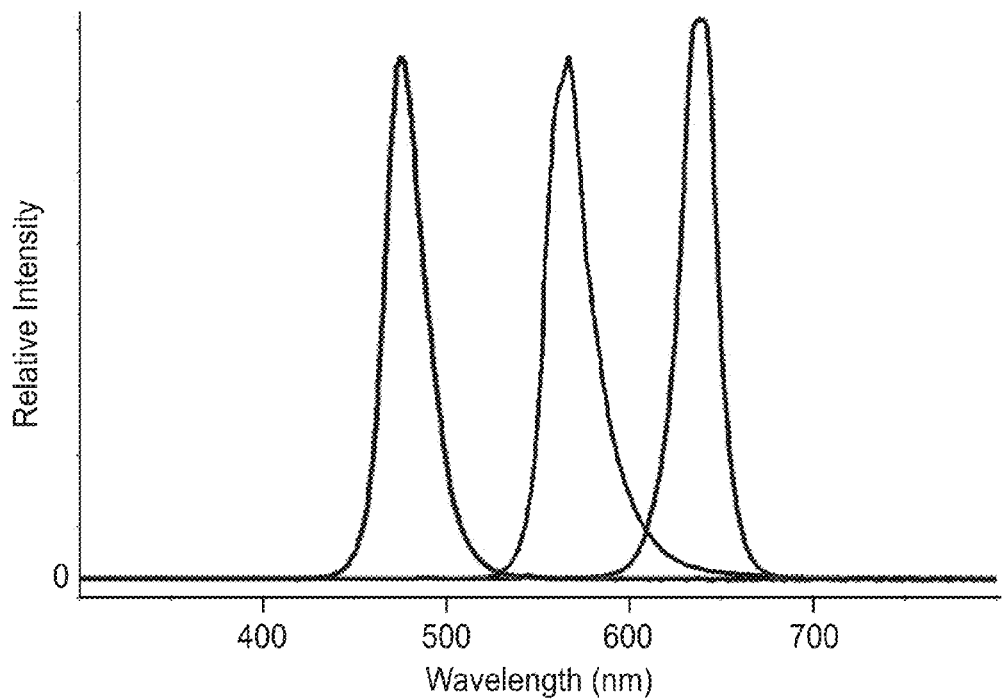
FIG. 18a is a schematic representation of the output spectrum of a collection of red, green, and blue LEDs.

In another variation of FIGS. 17 and 18, the light sources used in the lighting device may be selected from the group of discrete red, green, and blue emitting LEDs. By selecting an appropriate number of each of these three LED types, a desired proportion of these three colors can be injected into the light guide, and the first, second, and third total areas of the different diffractive surface features can then be tailored accordingly so as to provide substantially white light illumination. FIG. 18a is a schematic representation of the output spectrum of a collection of red, green, and blue LEDs in which the intensity in each of these three color bands is about equal. In such case, the first, second, and third total areas may be tailored to be approximately equal.

In much of the discussion above we explain how the diffractive surface features in combination with the light sources can be tailored to provide illumination light that is not only substantially uniform in color over the measurement portion of the reference surface, but also substantially white. In some cases, however, it may be desirable for the uniform color illumination on the measurement portion of the reference surface to not be substantially white. For example, in some decorative applications, uniform illumination of an alternative uniform color may be desired, such as: a primary color (red, green, or blue); a secondary color, i.e., yellow (red plus green), cyan (green plus blue), or magenta (blue plus red); or a color that mixes white light with one or more non-white colors to produce a shade of white outside of what is properly considered "substantially white". Such alternative colors can be provided as desired by appropriate selection of the light source(s), e.g., using one or more blue, green, red, yellow, purple, cyan, amber, or white LED, and appropriate design of the diffractive surface features used in the lighting device, by following the teachings and principles set forth in the present document.

Figure 19:
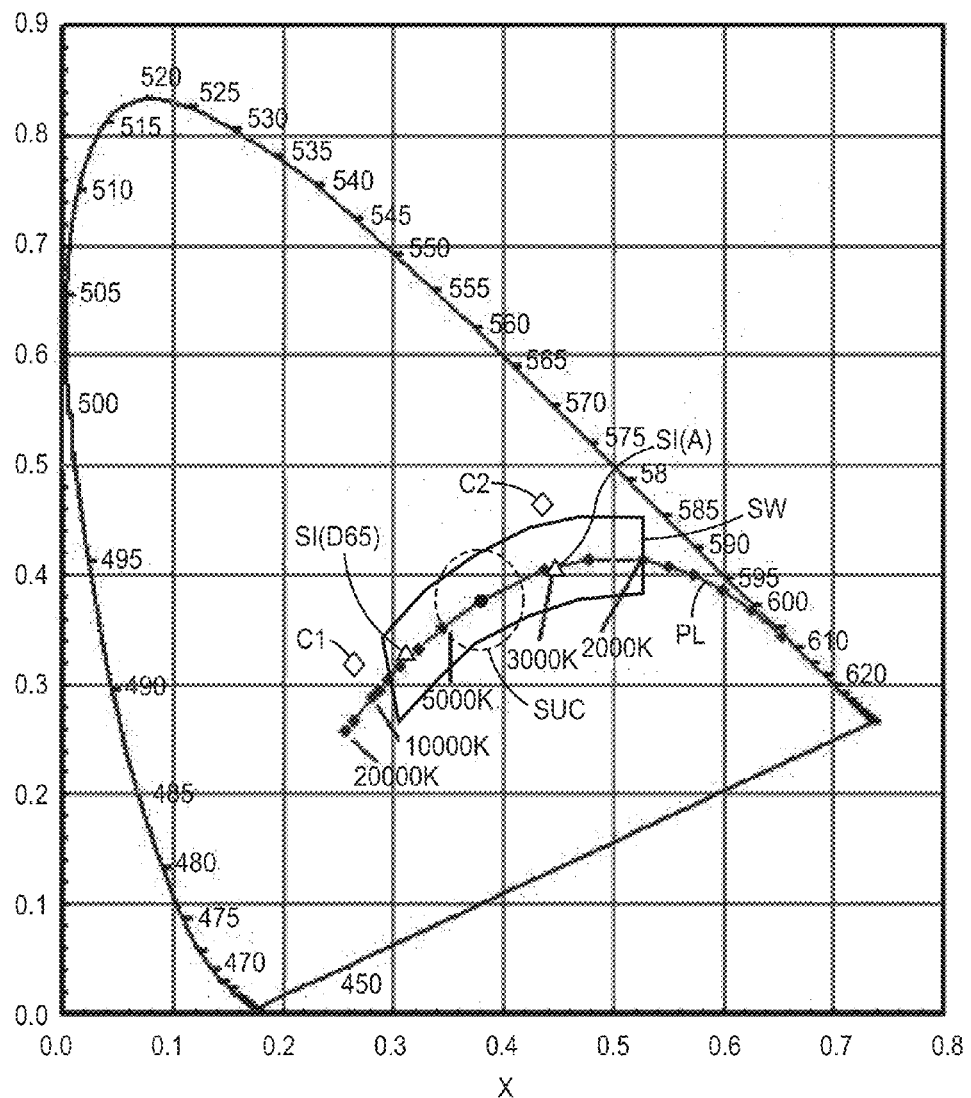
FIG. 19 is a CIE chromaticity diagram in which color-related aspects of the present disclosure are exemplified.

FIG. 19 is a CIE chromaticity diagram in which color-related aspects of the present disclosure are exemplified. In this diagram, PL refers to the well-known Planckian locus for black body emitters. The points SI(D65) and SI(A) fall on the Planckian locus, and refer respectively to the well-known standard illuminants D65 (representative of natural daylight) and A (representative of tungsten filament incandescent lighting). For purposes of this application, we define a "substantially white" region SW of the chromaticity diagram which encompasses the D65 and A standard illuminants, and which generally tracks a portion of the Planckian locus. The region SW encompasses a wide range of different shades of white, including both "cool white" and "warm white" colors, and including colors that are so widely separated that they would not be considered to provide a "substantially uniform color" over the measurement portion of the reference surface. The region SW is bounded by the following CIE chromaticity (x,y) coordinates: (0.305, 0.265), (0.29, 0.340), (0.330, 0.382), (0.375, 0.415), (0.425, 0.440), (0.470, 0.450), (0.530, 0.450), (0.530, 0.380), (0.470, 0.375), (0.425, 0.360), (0.375, 0.335), and (0.340, 0.305).

FIG. 19 also demonstrates how we can quantify the "substantially different" colors observed by the ordinary user in different regions of the light guide, and the "substantially uniform color" which characterizes the illumination provided on the reference surface of interest disposed at an intermediate distance from the light guide. The color points C1 and C2 represent colors that may be observed by the user in any two different regions of a given light guide at a particular viewing geometry. (Typically, the color changes continuously from one point or region to the next on the light guide at the particular viewing geometry, such that a wide band of colors, representative of all of the various colors that can be observed anywhere on the light guide at the particular viewing geometry, could be plotted on the chromaticity diagram. For simplicity, FIG. 19 shows only two such points.) The CIE (x,y) coordinates of these points can be measured, and the color difference between them can be calculated as the distance between points C1 and C2 on the chromaticity diagram: sqrt $((x2-x1)^2+(y2-y1)^2)$. If this color difference or distance is greater than a specified first color difference, the colors observed on the light guide can be considered to be "substantially different". For purposes of this application, the first color difference may be 0.12, or 0.15, or 0.2. The particular color points C1 and C2 shown in FIG. 19 should not be considered limiting, and the reader will understand that the light guide may exhibit colors at places on the CIE chromaticity diagram different from points C1 and C2.

With regard to the substantially uniform color that characterizes the illumination on the reference surface, we can define a sufficiently small region of the chromaticity diagram within which any two points can reasonably be considered to be substantially uniform color for applications of interest to the present application. The sufficiently small region is shown in FIG. 19 as a circular region SUC, which represents substantially uniform color. Within the region SUC, no two color points are separated from each other on the CIE x,y chromaticity diagram by more than a second color difference, the second color difference being the diameter of the circular region SUC. For purposes of this application, the second color difference may be 0.08, or 0.07, or 0.06. The particular region SUC shown in FIG. 19 should not be consider limiting, and the reader will understand that it can be translated to other positions on the CIE chromaticity diagram (whether or not overlapping with the substantially white region SW) while retaining its specified diameter, such that it continues to represent substantially uniform color even at colors that would not be considered to be substantially white.

In connection with color uniformity of the illumination on the reference surface, we can define a measurement portion, over which the color at different points can be compared, to be the portion of the reference surface at which the illuminance exceeds a predefined threshold value, i.e., at which the illumination is relatively intense or bright. Reference in this regard is directed to FIG. 20, which is a schematic plan view of an illuminated measurement portion of a reference surface of interest 2012. The reference surface 2012 is assumed to be planar, of indefinite extent, and perpendicular to the optical axis of the light guide. The reference surface is also assumed to be an ideal diffuse reflector, such that visible light impinging on it from the light guide is substantially diffusely scattered rather than being transmitted or absorbed. A simple approximation of such a surface is a sheet of white paper.

In FIG. 20, we assume the optical axis of the light guide intersects the reference surface 2012 at a point 2001. We also assume the surface 2012 is disposed at an intermediate distance from the light guide along the optical axis, as discussed elsewhere herein. We also assume the light emitted by the lighting device illuminates the surface 2012, and the illuminance is greatest within the closed boundaries BND1 and BND2, as explained further below. Within these boundaries, the illuminance has a maximum value, Imax, at a point A. In general, the point A may not coincide with the point 2001. At other places on the surface 2012, the illuminance may be equal to or less than, but not greater than, its value at the point A. The boundary BND1 is defined by points at which the illuminance has fallen to a value equal to Imax/2. Thus, the boundary BND1 defines a measurement portion of the surface 2012 over which the illuminance is no less than Imax/2 (and no greater than Imax). The boundary BND2 is similar to BND1, but extends to points at which the illuminance has fallen to a value equal to Imax/e, where "e" is the base of the natural logarithm function, equal to about 2.718. The boundary BND2 thus defines a measurement portion of the surface 2012 over which the illuminance is no less than Imax/e (and no greater than Imax).

The boundaries BND1 and BND2 may be considered to provide alternative definitions for the portion of the surface 2012 that is substantially illuminated by the lighting device, and over which the color of the illumination is desirably substantially uniform. Depending on the requirements or specifications of a particular application, one may wish to provide uniform color illumination only in the measurement portion associated with Imax/2 (e.g., BND1), while in other cases one may wish to provide the uniform color in the larger measurement portion associated with Imax/e (e.g., BND2). Regardless of which measurement portion, or which associated threshold, is chosen, we tailor the diffractive surface features, light sources, and other components of the lighting device as discussed herein so that the color of the illumination within the measurement portion is substantially uniform. By this we mean that no two points within the measurement portion are separated from each other on the CIE x,y chromaticity diagram by more than the second color difference discussed above in connection with the substantially uniform color region SUC.

Example 1

A lighting device suitable for use as a luminaire was made and evaluated. The device was similar in design to that of FIGS. 12, 12a, and 13. The device incorporated a circular-shaped light guide with diffractive surface features in the form of a spiral pattern, the diffractive surface features arranged into repeating patterns of six packet types with different groove or prism pitches. A mounting ring was used to position thirty-six equally spaced LEDs around the curved side surface of the light guide to inject light into the light guide. Further details of construction will now be given.

A precision diamond turning machine was used to cut a spiral-shaped groove pattern, which became the diffractive surface features in the lighting device after replication, into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch of the spiral was cycled between six specific values (315 nm, 345 nm, 375 nm, 410 nm, 445 nm, and 485 nm) to produce groove packets which formed nested annular regions that bordered each other but did not overlap with each other. Each annular region was a groove packet of constant pitch, and each set of six adjacent annular regions formed a repeating group or set of groove packets. The spiral pattern had an overall diameter of about 8 inches (about 20 centimeters). The radial dimensions or widths of the annular regions were selected so that the aggregate area for all of the six pitch values was the same. That is, the area of the entire grooved pattern was about 314 cm$^2$ ($\pi r^2$, where r≈10 cm), and the aggregate area for grooves having the 315 nm pitch was about 314/6≈52 cm$^2$, and the aggregate areas for grooves having each of the other five pitches was also about 52 cm$^2$. The annular regions were relatively narrow as measured radially, the maximum such dimension being about 150 micrometers.

The grooved surface of the resulting copper tool was then replicated in a thin flexible light-transmissive film (see e.g. layers 1111b and 1111c in FIG. 11) using a cast-and-cure technique. This was done by coating the grooved surface of the copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in a microreplicated optical film about 125 microns thick and having diffractive surface features in the form of a negative or inverted version (negative replica) of the spiral-shaped groove pattern from the precision copper tool. The refractive index of the PET support film was about 1.49 and the refractive index of the cured acrylate resin was about 1.5. The microreplicated optical film had a transparent appearance when viewed at an angle normal to the surface of the film, with a slightly blue hue. Objects could be viewed through the film with low distortion.

Excess material around the spiral pattern was cut away so that the microreplicated film was circular in shape. The film was directly attached to one major surface of a clear, light-transmissive circular acrylic plate of thickness 3 mm, the plate also having a diameter of about 20 cm. Attachment was accomplished using a 1 mil (approximately 25 micrometer) thick optically clear pressure sensitive adhesive (Vikuiti™ OCA 8171 from 3M Company), with the microreplicated surface of the film facing away from the plate and exposed to air, and with substantially no air gaps between the film and the plate. The combination of the plate and the film resulted in a light guide with diffractive surface features on (only) one major surface thereof for light extraction, the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent to the circular side surface of the light guide.

Figure 21A:
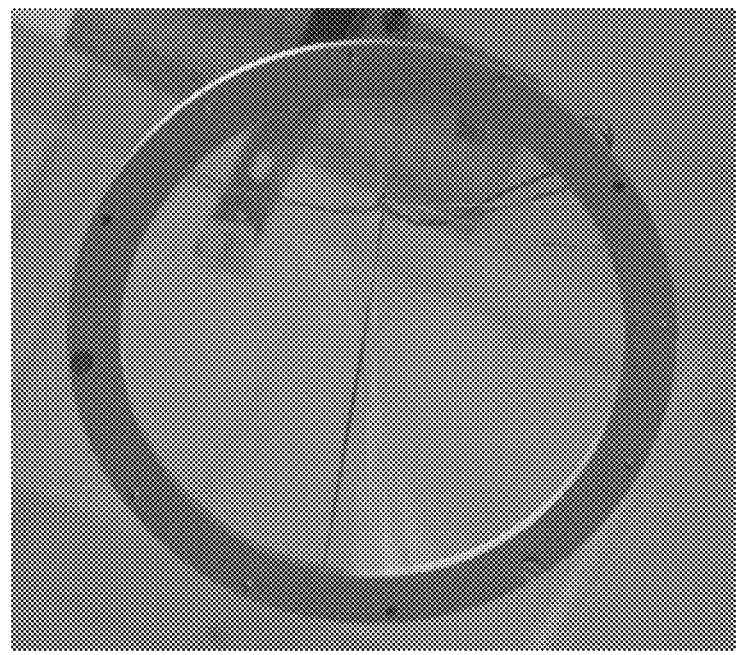
FIG. 21a is a photograph of a lighting device that was constructed using a circular light guide having curved diffractive surface structures, the lighting device photographed from an oblique viewing angle with ambient light on and the discrete light sources of the lighting device turned off.

The lighting device so constructed was connected to a power supply and suspended from the ceiling of a room. FIG. 21a is a photograph of the lighting device with the power supply turned off and ambient room lights turned on. The viewing direction for this photograph was slightly oblique, i.e., not directly beneath the lighting device along its symmetry or optical axis, but at a moderate angle relative to such axis. Note that details of the ceiling can be seen through the light guide with little or no significant distortion. Wires used to suspend the lighting device and connect it to the power supply can also be seen through the light guide. In this "off" state, the light guide had a slightly bluish hue similar to that of the microreplicated film by itself.

Figure 21B:
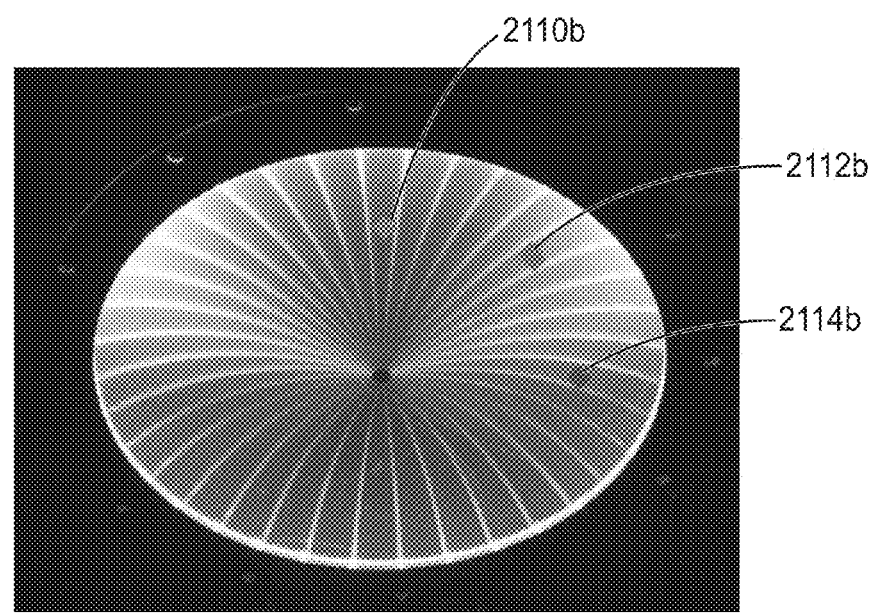
FIG. 21b is a photograph of the lighting device of FIG. 21a, but with ambient light off and the discrete light sources of the lighting device turned on, and at a slightly more oblique viewing angle, and with selected small areas or spots on the surface of the lighting device identified and labeled.
Figure 21C:
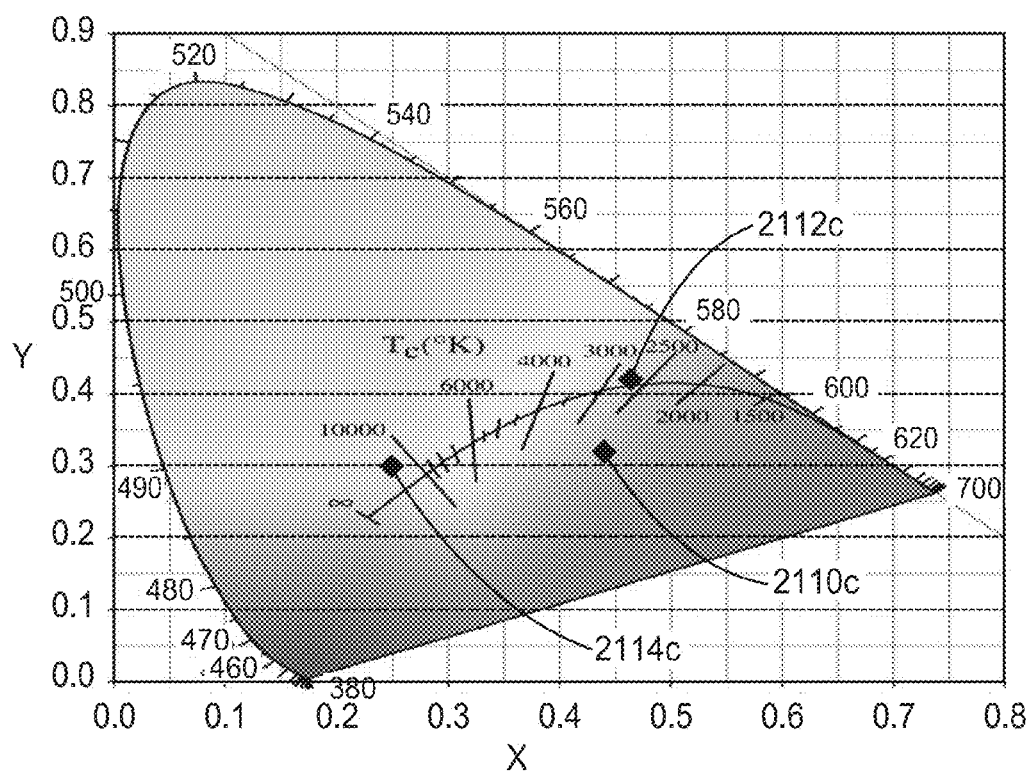
FIG. 21c is a graph of CIE chromaticity coordinates for the selected spots of FIG. 21b.

FIG. 21b is a photograph of the same lighting device at a somewhat more oblique viewing angle relative to that of FIG. 21a, but also with the power supply (and thus all 36 LEDs) turned on and the ambient room lights turned off Variable color hues could be seen at different areas of the light guide, the colors not being visible in the grayscale photograph of FIG. 21b. Bright bands could also be seen over the output area of the light guide, one band for each of the 36 energized light sources, and these bands are plainly visible in FIG. 21b. The bands can be seen to form a pattern having a 3-dimensional appearance. When observed at other viewing directions, the bright bands changed shape, and variable color hues could be seen across the light guide at virtually any viewing direction. Three small areas or points 2110b, 2112b, 2114b are identified in the photograph on the output area of the light guide between adjacent bright bands. The color at each of these points was measured in terms of the known CIE chromaticity (x,y) coordinates. The CIE (x,y) color coordinates, which are dimensionless, should not be confused with spatial (x,y) coordinates e.g. as in the Cartesian x-y-z coordinate systems shown in various figures herein. The measurement of color was done using a camera configured as a colorimeter, type PR-650 SpectraScan™ from Photo Research Inc., Chatsworth, Calif. Visually, the area 2110b had a dark red color, and is plotted as point 2110c on the CIE color coordinate scale of FIG. 21c. The area 2112b had an orange or brown color, and is plotted as point 2112c on the scale of FIG. 21c. The area 2114b had a blue color, and is plotted as point 2114c on the scale of FIG. 21c. The CIE color difference between the points 2112c and 2114c was 0.25.

The lighting device of Example 1, with its extended area light guide and diffractive surface features, has the effect of converting the LED light sources, which when viewed directly with the eye appear as very bright point sources, into an extended area source with significantly lower luminance so that the lighting device can be directly viewed without hurting the eyes. The diffractive surface features not only serve the functional purpose of extracting guided-mode light out of the light guide, but also enhance the aesthetic appeal of the lighting device by adding attractive colors and the 3-dimensional band pattern when the lighting device is directly observed (e.g. as in FIG. 21b). We have found, however, that the aesthetic colors and bands seen by a user when looking directly at the lighting device need not detract from the ability of the lighting device to provide substantially uniform white light illumination for objects and surfaces remote from the lighting device.

Figure 22A:
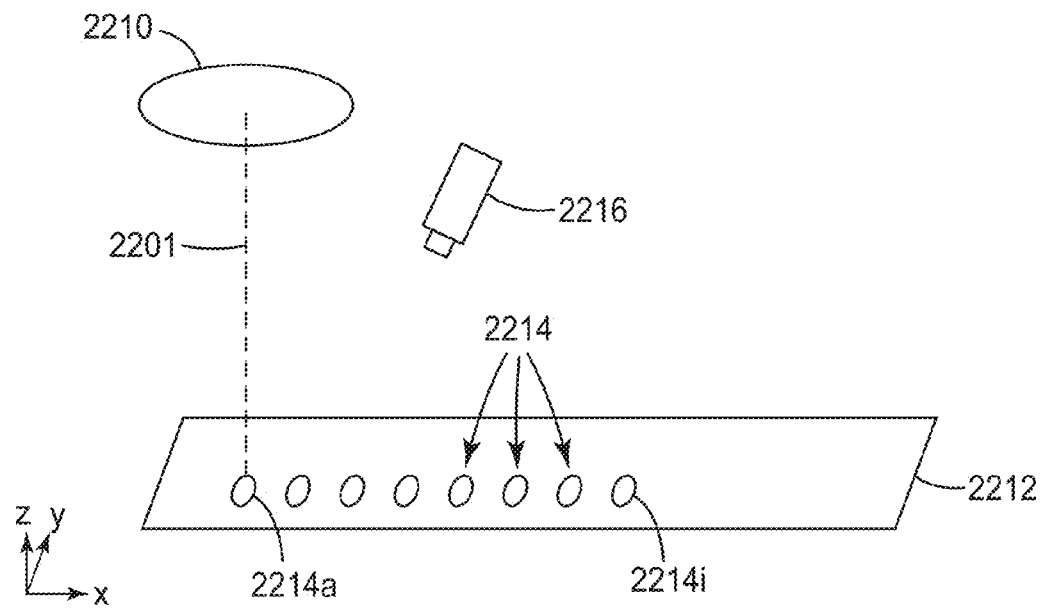
FIG. 22a is a schematic view of a setup used for measuring the optical properties of a reference surface illuminated by the lighting device of FIG. 21b.

The remote illumination produced by the Example 1 lighting device on a reference surface was tested using the setup shown in FIG. 22a. In this setup, item 2210 represents the Example 1 lighting device, suspended from the ceiling. The lighting device 2210 had an optical axis or symmetry axis 2201 which passed through the center of the disk-shaped light guide and was perpendicular to the light guide. In the figure, the optical axis 2201 is parallel to the z-axis of the Cartesian coordinate system. A flat reference surface 2212 extended parallel to the x-y plane, and was disposed at a distance D of 2.3 meters from the lighting device 2210, as measured along the optical axis 2201. The 2.3 meter distance D compares to the 20 cm characteristic transverse dimension L of the light guide (in this case, the maximum, minimum, and average transverse dimensions were equal to each other because of the circular shape of the light guide) by a factor of 10.1. The flat surface 2212 was covered with a white diffusely reflective film (product code DLR80 from E.I. du Pont de Nemours and Company) having a 98% reflectivity for visible light. A camera 2216 was then positioned as shown, oriented at an angle of about 30 degrees relative to the optical axis 2201, to obtain a color image of the white diffuse surface as illuminated solely by the Example 1 lighting device 2210. The PR-650 camera mentioned above was used as the camera 2216.

Due to the circular symmetry of the Example 1 lighting device, the illumination provided on the reference surface 2212 was also substantially circularly symmetric. This allowed us to effectively evaluate the color of the illumination over the entire (circular) measurement portion of the reference surface by measuring the color of a single row of small areas or points, which are collectively labeled 2214 in the figure. (Although 8 areas or points 2214 are shown in the figure, a total of 7 points were used for the measurements reported here.) The color at each of these small areas was measured using the PR-650 camera. The small areas were equally spaced along the x-axis, from a first area 2214a, which was aligned with the optical axis 2201, to a last area 2214i. Maximum illuminance Imax occurred at approximately the centrally located first area 2214a, and the illuminance dropped to Imax/e at a distance (radius) of about 1.85 meters from the central point or area 2214a. The distance from the first area 2214a to the last area 2214i was 183 cm, i.e., about 1.85 meters. The color measurements thus fairly represented the color variations present in a 3.7 meter diameter measurement portion corresponding to an illuminance threshold of Imax/e. Visually, the illuminated flat surface 2212 appeared nominally white with good spatial color uniformity over the measurement portion.

Figure 22B:
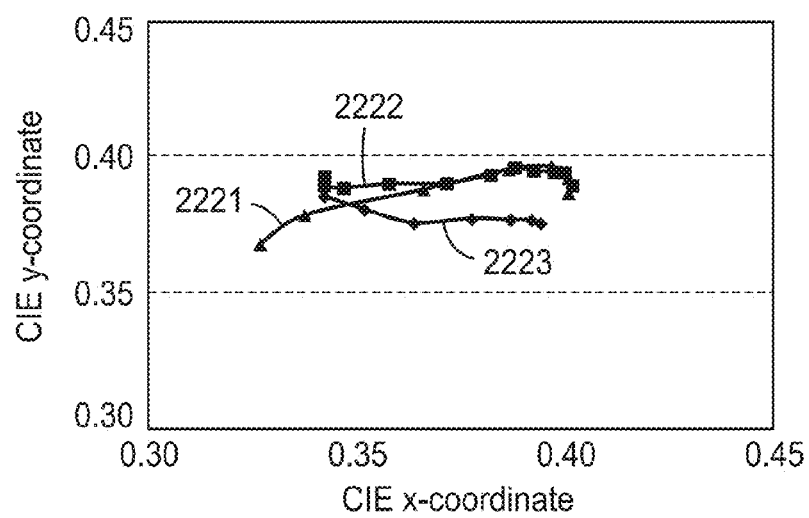
FIG. 22b is a graph of measured CIE chromaticity coordinates for selected spots representative of illuminated measurement portions for three different positions of the reference surface.

The measured CIE color coordinates for the areas 2214 are plotted on the CIE color coordinate scale of FIG. 22b. The measured colors define a curve 2223, having one endpoint corresponding to the color at area 2214a, and an opposite endpoint corresponding to the color at area 2214i. The camera 2216 thus measured a non-zero color variability within the Imax/e measurement portion for the lighting device 2210. However, the color variability was relatively small: the CIE color difference between the endpoints of the curve 2223 is 0.053. The overall color variability throughout the Imax/e measurement portion was thus less than 0.08, 0.07, and 0.06. Furthermore, all of the measured points on the curve 2223 remain close to the Planckian locus, and are within the substantially white region SW as described in connection with FIG. 19.

Additional measurements were then taken for this Example 1 in substantially the same way as described above, except that the reference surface 2212 was positioned at a distance D of 1 meter, rather than 2.3 meters, from the lighting device 2210. This reduced the diameter of the Imax/e measurement portion from 3.7 meters to 1.83 meters. Color measurements were again taken by the camera 2216 along the single row of small equally spaced areas or points 2214, a first such area being aligned with the optical axis 2201, and having a maximum illuminance Imax, and a last such area being disposed at a distance of 91.4 cm from the first area, and having an illuminance of about Imax/e. The color measurements thus fairly represented the color variations present in a 1.83 meter diameter measurement portion corresponding to an illuminance threshold of Imax/e. Visually, the illuminated flat surface 2212 appeared nominally white, with a spatial color uniformity within the Imax/e measurement portion that was about as good as was measured at a distance D of 2.3 meters.

The measured CIE color coordinates for the areas 2214, for the case of D=1 meter, are also plotted on the CIE color coordinate scale of FIG. 22b. The measured colors define a curve 2222, having one endpoint corresponding to the color at the first area 2214a, and an opposite endpoint corresponding to the color at the last area 2214i. The camera 2216 thus measured a non-zero color variability within the Imax/e measurement portion for the lighting device 2210 for a reference surface disposed at this distance D=1 meter. However, the color variability was again relatively small: the CIE color difference between the endpoints of the curve 2222 is 0.059. The overall color variability throughout the Imax/e measurement portion was thus less than 0.08, 0.07, and 0.06. Furthermore, all of the measured points on the curve 2223 remain close to the Planckian locus, and are within the substantially white region SW as described in connection with FIG. 19.

Still more measurements were then taken for this Example 1 in substantially the same way as described above, except that the reference surface 2212 was positioned at a distance D of 0.5 meters, rather than 1 or 2.3 meters, from the lighting device 2210. This reduced the diameter of the Imax/e measurement portion to 0.91 meters. Color measurements were again taken by the camera 2216 along the single row of small equally spaced areas or points 2214, a first such area being aligned with the optical axis 2201, and having a maximum illuminance Imax, and a last such area being disposed at a distance of 45.7 cm from the first area, and having an illuminance of about Imax/e. The color measurements thus fairly represented the color variations present in a 0.91 meter diameter measurement portion corresponding to an illuminance threshold of Imax/e. Visually, the illuminated flat surface 2212 appeared nominally white, with a spatial color uniformity within the Imax/e measurement portion that was not as small as was measured at distances D of 2.3 meters and 1 meter.

The measured CIE color coordinates for the areas 2214, for the case of D=0.5 meters, are also plotted on the CIE color coordinate scale of FIG. 22b. The measured colors define a curve 2221, having one endpoint corresponding to the color at the first area 2214a, and an opposite endpoint corresponding to the color at the last area 2214i. The camera 2216 thus measured a non-zero color variability within the Imax/e measurement portion for the lighting device 2210 for a reference surface disposed at this distance D=0.5 meter. The color variability was characterized by a CIE color difference between the endpoints of the curve 2221 equal to about 0.078. The overall color variability throughout the Imax/e measurement portion was thus less than 0.08. Furthermore, all of the measured points on the curve 2223 remain close to the Planckian locus, and are within the substantially white region SW as described in connection with FIG. 19.

The design principles discussed herein can be used to construct alternative lighting devices similar to that of Example 1, but wherein: the light guide shape, dimensions, and/or in-plane aspect ratio is different; the number, color, and distribution of the light sources is different; the diffractive surface features are different in pitch, distribution, or shape relative to those of Example 1; the difference in color seen by the ordinary user in different regions of the light guide is greater or lesser than that of Example 1; the illumination of substantially uniform color at the reference surface of interest can have a greater or lesser variability than that of Example 1, and the lighting device may be tailored such that the reference surface is located at any desired intermediate distance from the light guide, e.g., anywhere from 2 L to 50 L, or anywhere from 0.2 to 15 meters; the illumination of a substantially uniform color can have an overall color that is not substantially white, or that is substantially white but located in a different portion of the substantially white region SW than that of Example 1.

The teachings of this application can be used in combination with the teachings of any or all of the following commonly assigned applications, which are incorporated herein by reference and filed on even date herewith: U.S. patent application Ser. No. 13/572,805, "Diffractive Lighting Devices With 3-Dimensional Appearance", filed Aug. 13, 2012; U.S. patent application Ser. No. 13/572,813, "Lighting Devices With Patterned Printing of Diffractive Extraction Features", filed Aug. 13, 2012; and U.S. patent application Ser. No. 13/572,835, "Diffractive Luminaires", filed Aug. 13, 2012.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A luminaire, comprising:
 a light guide having an optical axis and a first major surface, the first major surface having a plurality of diffractive surface features therein adapted to couple guided-mode light out of the light guide; and
 one or more light sources disposed to inject light into the light guide;
 wherein the plurality of diffractive surface features comprise diffractive surface features of different pitches;
 wherein the diffractive surface features extract guided-mode light from the light guide such that an ordinary user of the luminaire observes substantially different colors in different regions of the light guide at a viewing geometry; and
 wherein the diffractive surface features and the light source(s) in combination are tailored to provide illumination of a substantially uniform color at a reference surface of interest perpendicular to the optical axis and separated from the light guide by an intermediate distance D, and wherein the substantially uniform color is also substantially white.

2. The luminaire of claim 1, wherein the substantially different colors include at least two colors separated from each other on a CIE x,y chromaticity diagram by more than a first color difference, the first color difference being at least 0.12.

3. The luminaire of claim 2, wherein the first color difference is at least 0.15.

4. The luminaire of claim 3, wherein the first color difference is 0.2.

5. The luminaire of claim 1, wherein the illumination on the reference surface has a maximum value Imax, wherein the substantially uniform color is characterized over a measurement portion of the reference surface at which the illumination provides an illuminance of at least Imax/e, and wherein no two points within the measurement portion are separated from each other on the CIE x,y chromaticity diagram by more than a second color difference, the second color difference being up to 0.08.

6. The luminaire of claim 5, wherein the second color difference is up to 0.07.

7. The luminaire of claim 6, wherein the second color difference is 0.06.

8. The luminaire of claim 1, wherein the first major surface of the light guide has a characteristic transverse dimension L, and wherein D is at least 2*L but no more than 50*L.

9. The luminaire of claim 1, wherein the characteristic transverse dimension L is a maximum in-plane dimension of the first major surface.

10. The luminaire of claim 1, wherein the characteristic transverse dimension L is a minimum in-plane dimension of the first major surface.

11. The luminaire of claim 1, wherein the characteristic transverse dimension L is an average in-plane dimension of the first major surface.

12. The luminaire of claim 1, wherein D is at least 0.2 meters but no more than 15 meters.

13. The luminaire of claim 1, wherein substantially white refers to an area on a CIE x,y chromaticity diagram whose boundary is defined by twelve color points: (0.305, 0.265), (0.29, 0.340), (0.330, 0.382), (0.375, 0.415), (0.425, 0.440), (0.470, 0.450), (0.530, 0.450), (0.530, 0.380), (0.470, 0.375), (0.425, 0.360), (0.375, 0.335), and (0.340, 0.305).

14. The luminaire of claim 1, wherein each of the one or more light sources emits substantially white light.

15. The luminaire of claim 1, wherein the plurality of diffractive surface features includes one or more first packets of first diffractive surface features having a first pitch, and one or more second packets of second diffractive surface features having a second pitch different from the first pitch.

16. The luminaire of claim 15, wherein the plurality of diffractive surface features further includes one or more third packets of third diffractive surface features having a third pitch different from the first and second pitches.

17. The luminaire of claim 16, wherein the one or more first packets occupy a first total area of the light guide, the one or more second packets occupy a second total area of the light guide, and the one or more third packets occupy a third total area of the light guide, and wherein relative proportions of the first, second, and third total areas are related to a spectral intensity distribution of the one or more light sources.

18. The luminaire of claim 16, wherein the first pitch is tailored to extract blue light parallel to the optical axis, the second pitch is tailored to extract green light parallel to the optical axis, and the third pitch is tailored to extract red light parallel to the optical axis.

19. The luminaire of claim 16, wherein the one or more first packets includes a plurality of first packets, wherein the one or more second packets includes a plurality of second packets, and wherein the one or more third packets includes a plurality of third packets, the first, second, and third packets arranged in repeating groups on the first major surface of the light guide.

20. The luminaire of claim 16, wherein each of the first, second, and third diffractive surface features includes surface features that, in plan view, extend along a plurality of in-plane directions.

21. The luminaire of claim 20, wherein each of the first, second, and third diffractive surface features includes surface features that, in plan view, are substantially circular in shape.

22. A luminaire, comprising:
a light guide having an optical axis and a first major surface, the first major surface having a plurality of diffractive surface features therein adapted to couple guided-mode light out of the light guide; and
one or more light sources disposed to inject light into the light guide;
wherein the plurality of diffractive surface features comprise diffractive surface features of different pitches;
wherein the diffractive surface features extract guided-mode light from the light guide such that an ordinary user of the luminaire observes substantially different colors in different regions of the light guide at a viewing geometry; and
wherein the diffractive surface features and the light source(s) in combination are tailored to provide illumination of a substantially uniform color at a reference surface of interest perpendicular to the optical axis and separated from the light guide by an intermediate distance D.

23. The luminaire of claim 22, wherein the substantially different colors include at least two colors separated from each other on a CIE x,y chromaticity diagram by more than a first color difference, the first color difference being at least 0.12, wherein the illumination on the reference surface has a maximum value Imax, wherein the substantially uniform color is characterized over a measurement portion of the reference surface at which the illumination provided an illuminance of at least Imax/e, and wherein no two points within the observation portion are separated from each other on the CIE x,y chromaticity diagram by more than a second color difference, the second color difference being up to 0.08.

24. The luminaire of claim 23, wherein the first color difference is at least 0.15, and the second color difference is up to 0.07.

25. The luminaire of claim 24, wherein the first color difference is 0.2, and the second color difference is 0.06.

26. The luminaire of claim 23, wherein the first major surface of the light guide has a characteristic transverse dimension L, and wherein D is at least 2*L but no more than 50*L.

27. The luminaire of claim 23, wherein the characteristic transverse dimension L is a maximum, minimum, or average in-plane dimension of the first major surface.

28. The luminaire of claim 23, wherein D is at least 0.2 meters but no more than 15 meters.

* * * * *